United States Patent
Wu

(10) Patent No.: US 10,725,195 B2
(45) Date of Patent: Jul. 28, 2020

(54) METHODS OF ESTIMATING BOREHOLE AND FORMATION PROPERTIES USING AN ELECTROMAGNETIC INDUCTION LOGGING TOOL HAVING RANDOM TOOL DECENTER POSITIONS DURING DATA ACQUISITION

(71) Applicant: Schlumberger Technology Corporation, Sugar Land, TX (US)

(72) Inventor: Peter Wu, Missouri City, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 301 days.

(21) Appl. No.: 15/762,476

(22) PCT Filed: Sep. 8, 2016

(86) PCT No.: PCT/US2016/050605
§ 371 (c)(1),
(2) Date: Mar. 22, 2018

(87) PCT Pub. No.: WO2017/053072
PCT Pub. Date: Mar. 30, 2017

(65) Prior Publication Data
US 2018/0299577 A1    Oct. 18, 2018

Related U.S. Application Data

(60) Provisional application No. 62/222,452, filed on Sep. 23, 2015.

(51) Int. Cl.
*G01V 3/28* (2006.01)
*G01V 3/38* (2006.01)

(52) U.S. Cl.
CPC . *G01V 3/28* (2013.01); *G01V 3/38* (2013.01)

(58) Field of Classification Search
CPC . G01V 3/104; G01V 3/12; G01V 3/18; G01V 3/26; G01V 3/28; G01V 3/30; G01V 3/38

(Continued)

(56) References Cited

U.S. PATENT DOCUMENTS 5,159,577 A  *  10/1992  Twist ..................... G01V 1/22
                                                         367/25
2002/0113592 A1    8/2002  Omeragic
(Continued)

FOREIGN PATENT DOCUMENTS

WO    WO2013095997 A1    6/2013
WO    WO2017078915 A1    5/2017

OTHER PUBLICATIONS

International Search Report and Written Opinion issued in International Patent application PCT/US2016/050605, dated Dec. 22, 2016. 10 pages.

(Continued)

*Primary Examiner* — Steven L Yeninas

(57) ABSTRACT

Described herein is a method including acquiring a set of transimpedance coupling voltages, between different antenna components of different axes of a transmitting station transmitting into a formation and different antenna components of different axes of a receiving station receiving from the formation, using an induction tool undergoing random movement during the acquisition. Fourier coefficients for the set of transimpedance coupling voltages are determined using a least square process. A mean tool eccentering azimuthal angle and an apparent formation azimuthal angle are estimated as a function of the Fourier coefficients. Compensated measurements are computed as a function of the Fourier coefficients. An inversion loop receives as input the compensated measurements, the estimated mean tool eccentering azimuthal angle, and the estimated apparent formation azimuth, and outputs final parameters as a function thereof.

20 Claims, 19 Drawing Sheets

(58) Field of Classification Search
USPC .......................... 324/333, 338, 339, 343, 356
See application file for complete search history.

(56) References Cited

U.S. PATENT DOCUMENTS

| | | |
|---|---|---|
| 2005/0083063 A1 | 4/2005 | Omeragic et al. |
| 2010/0082255 A1* | 4/2010 | Davydycheva .......... G01V 3/28 702/7 |
| 2010/0198569 A1* | 8/2010 | Wu .......................... G01V 3/38 703/6 |
| 2014/0121978 A1* | 5/2014 | Wu .......................... G01V 3/38 702/11 |
| 2014/0257703 A1 | 9/2014 | Wu et al. |
| 2017/0075024 A1 | 3/2017 | Wu et al. |

OTHER PUBLICATIONS

Levenberg, Kenneth., A Method for the Solution of Certain Problems in Least Squares. Quarterly of Applied Mathematics vol. 2, No. 2. 1944. pp. 164-168.
Marquardt, Donald W., An Algorithm for Least-Squares Estimation of Nonlinear Parameters. Journal of the Society for Industrial and Applied Mathematics. vol. 11, No. 2 (Jun. 1963), pp. 431-441.
Bjorck, Ake., Numerical methods for least squares problems. Society for Industrial and Applied Mathematics. Philadelphia, PA. 1996. Chapter 9. pp. 339-358.

\* cited by examiner

METHODS OF ESTIMATING BOREHOLE AND FORMATION PROPERTIES USING AN ELECTROMAGNETIC INDUCTION LOGGING TOOL HAVING RANDOM TOOL DECENTER POSITIONS DURING DATA ACQUISITION

CROSS REFERENCE TO RELATED APPLICATIONS

The present application claims priority to U.S. Provisional Application 62/222,452 filed Sep. 23, 2015 the entirety of which is incorporated by reference.

FIELD OF THE INVENTION

This disclosure is related to the field of well logging, and, in particular, to methods of estimating borehole and formation properties from data collected using electromagnetic induction tools having random tool eccentering distances and random tool eccentering azimuthal angles during data acquisition.

BACKGROUND INFORMATION

A commonly used technique for evaluating formations surrounding an earth borehole is resistivity logging. A porous formation having a high resistivity generally indicates the presence of hydrocarbons, while a porous formation with low resistivity generally indicates water saturation, for example.

Modern induction resistivity logging tools operate by transmitting a signal from a transmitter station and measuring the voltage of the received signal at a receiver station. These voltages are referred to as transimpedance coupling voltages and are sensitive to the formation properties, such as horizontal and vertical conductivities, relative dip angle, and the dip azimuthal direction, rendering such induction logging tools capable of delivering a data from which a variety of useful information about the formation can be extracted and estimated.

These transimpedance coupling voltages, however, are also sensitive to borehole and tool properties, such as mud conductivity, hole diameter, tool eccentering distance, and tool eccentering azimuthal angle. Thus, the transimpedance coupling voltages are corrected for the borehole and tool properties. Mud conductivity and hole diameter can easily be measured, and in many cases are already known, so compensation for these borehole properties is relatively straightforward. Measuring tool eccentering distance and tool eccentering azimuthal angle is difficult as those parameters are in constant flux during drilling. For modern single-axis induction resistivity logging tools, the sensitivity to tool eccentering distance and tool eccentering azimuthal angle is minimal enough such that it can effectively be ignored and an inversion can be performed to achieve accurate results.

In the case where a multi-axial induction resistivity logging tool is used, the sensitivity to tool eccentering distance and tool eccentering azimuthal angle for some axes is large. Since the tool eccentering distance and tool eccentering azimuthal angle is constantly changing, compensating for such constantly changing conditions is difficult. However, the result of not compensating is that the results for some axes are unacceptable inaccurate.

Consequently, a method of estimating borehole and formation properties that overcomes this difficult is commercially desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method disclosed herein includes acquiring a set of transimpedance coupling voltages, between different antenna components of different axes of a transmitting station transmitting into a formation and different antenna components of different axes of a receiving station receiving from the formation, using an induction tool undergoing random movement during the acquisition. Fourier coefficients of the set of transimpedance coupling voltages are then determined using a least square process, using a computing device. A mean tool eccentering azimuthal angle and an apparent formation azimuthal angle are estimated as a function of the Fourier coefficients, using the computing device. Compensated measurements are computed as a function of the Fourier coefficients, using the computing device. An inversion loop is executed by the computing device, with the inversion loop receiving as input the compensated measurements, the estimated mean tool eccentering azimuthal angle, and the estimated apparent formation azimuth, and outputting final parameters as a function thereof.

Also disclosed herein is a well logging apparatus which includes a resistivity sub and a control apparatus for the resistivity sub. The resistivity sub includes at least one transmitter station with a plurality of transmission antenna components each corresponding to a different axis, and at least one receiver station with a plurality of reception antenna components each corresponding to a different axis. The control apparatus is configured to operate the resistivity sub so as to transmit signals from the at least one transmitter station while the resistivity sub is undergoing random movement, and measure a set of transimpedance coupling voltages between the at least one transmitter station and the at least one receiver station while the resistivity sub is undergoing random movement. The control apparatus also determines Fourier coefficients of the set of transimpedance coupling voltages using a least square process, and estimates a mean tool eccentering azimuthal angle and an apparent formation azimuthal angle as a function of the Fourier coefficients. The control apparatus further computes compensated measurements as a function of the Fourier coefficients, using the computing device, and executes an inversion loop receiving as input the compensated measurements, the estimated mean tool eccentering azimuthal angle, and the estimated apparent formation azimuth, and outputting final parameters as a function thereof.

BRIEF DESCRIPTION OF THE DRAWINGS

FIG. 8 shows Fourier coefficients obtained from a simulated data record in accordance with the techniques described herein.

FIG. 13 shows the Fourier coefficients obtained from the simulated data shown in FIG. 11.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
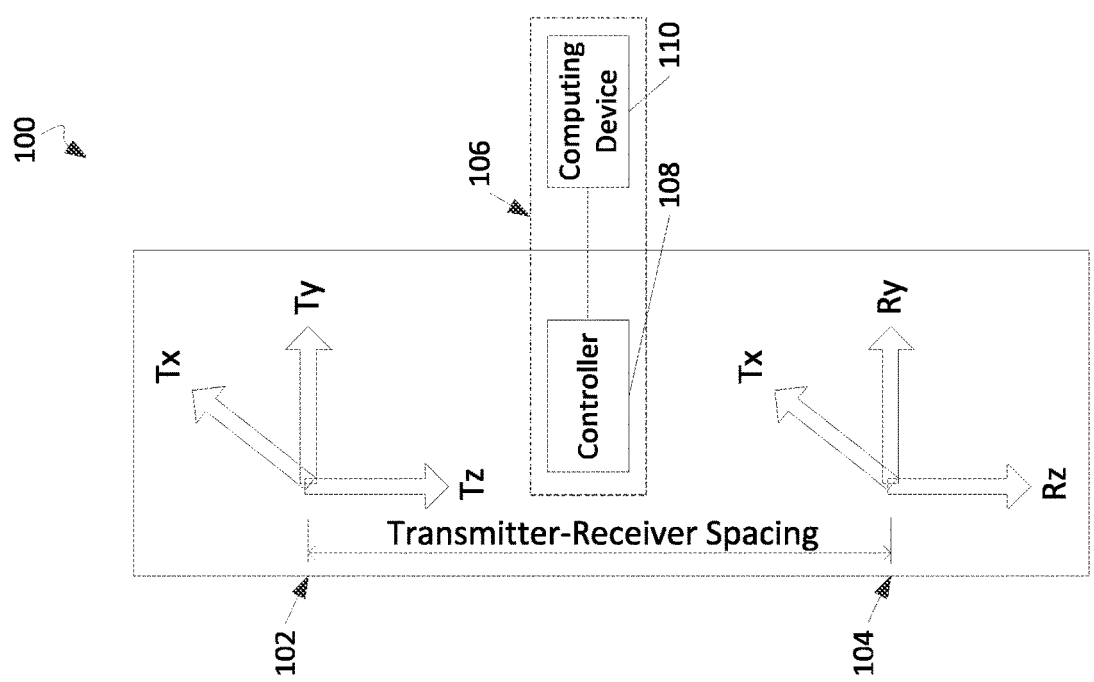
FIG. 1 shows a multi-axial induction resistivity logging tool which can be used with the techniques described herein.

The disclosure contained herein related to methods of estimating formation and/or borehole properties using a multi-axial induction resistivity logging tool. As shown in FIG. 1, a multi-axial induction resistivity logging tool 100 includes a transmitter station 102 and a receiver station 104. The transmitter station 102 and the receiver station each include three orthogonal coils oriented in the x, y, and z directions. The tool 100 also includes a controller 108 that operates the transmitter station 102 to transmit a signal from its orthogonal coils and measures the voltage of the received signals at the orthogonal coils of the receiver station 104. The voltages of the received signals will be referred to herein as a transimpedance coupling voltages.

Since the transmitter station 102 and receiver station 104 are tri-axial, there will be nine measured transimpedance coupling voltage, which can be recorded in a matrix as Vijkl, where i indicates which transmitter station 102 (in the case where the tool 100 has more than one transmitter station) the signal was transmitted from, where j indicates which receiver station 104 (in the case where the tool 100 has more than one receiver station) the signal was received at, and where k and l each represent one of the directions x, y, or z. Thus, V11xx would refer to the transimpedance voltage of the signal transmitted from the x coil of a first transmitter station to the x coil of a first receiver station, while V11xy would refer to the transimpedance voltage of the signal transmitted from the x coil of the first transmitter station to the y coil of the first receiver station.

The transimpedance coupling voltage Vijkl is a complex voltage measurement with the quadrature measurement being the imaginary part. Optionally, the term apparent conductivity matrix can be used by converting the induction transimpedance coupling voltage matrix Zij=Vijkl at given i, j value to apparent conductivity matrix σij through a simple relation, Zij=K●σij, where K is a constant k-factor matrix and ● is symbol for matrix dot-product.

Figure 2:
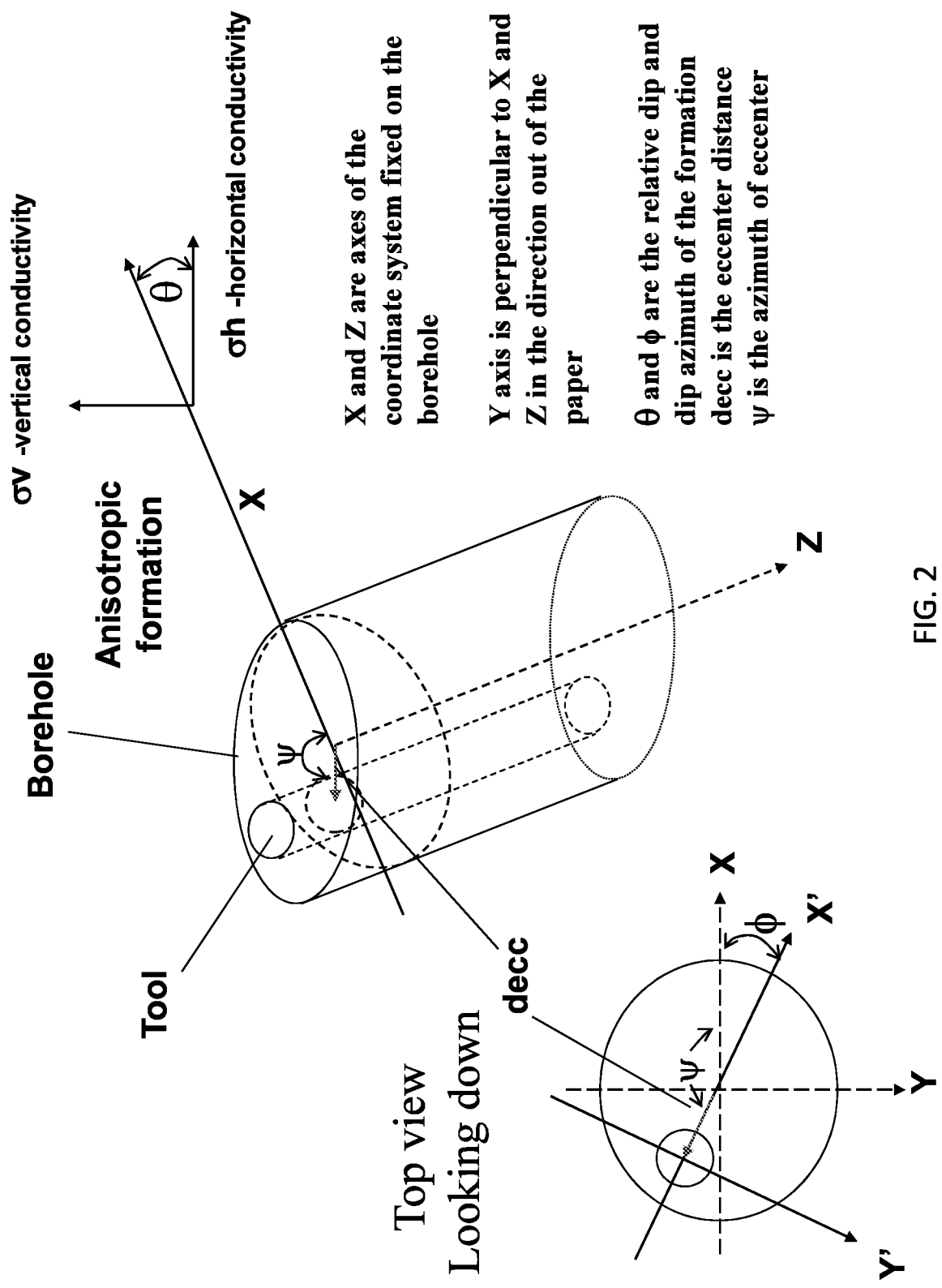
FIG. 2 shows the multi-axial induction resistivity logging tool from FIG. 1 in a borehole.

The tool 100 described above, eccentered, and positioned in a borehole through an anisotropic formation with a dip angle is illustrated in FIG. 2. Properties of the formation, such as horizontal and vertical conductivities (σh, σv), relative dip angle (θ), and the dip azimuthal angle (θ or AZF), as well as borehole/tool properties, such as mud conductivity (σmud), hole diameter (hd), tool eccentering distance (decc), and tool eccentering azimuthal angle (ψ or AZT), affect the transimpedance coupling voltages Vijkl. As shown in FIG. 2, the tool eccentering distance represents a distance between the longitudinal axis of the tool and the longitudinal axis of the borehole, and the tool eccentering azimuthal angle is the angle of the vector extending from the longitudinal axis of the borehole to the longitudinal axis of the tool.

Figure 4:
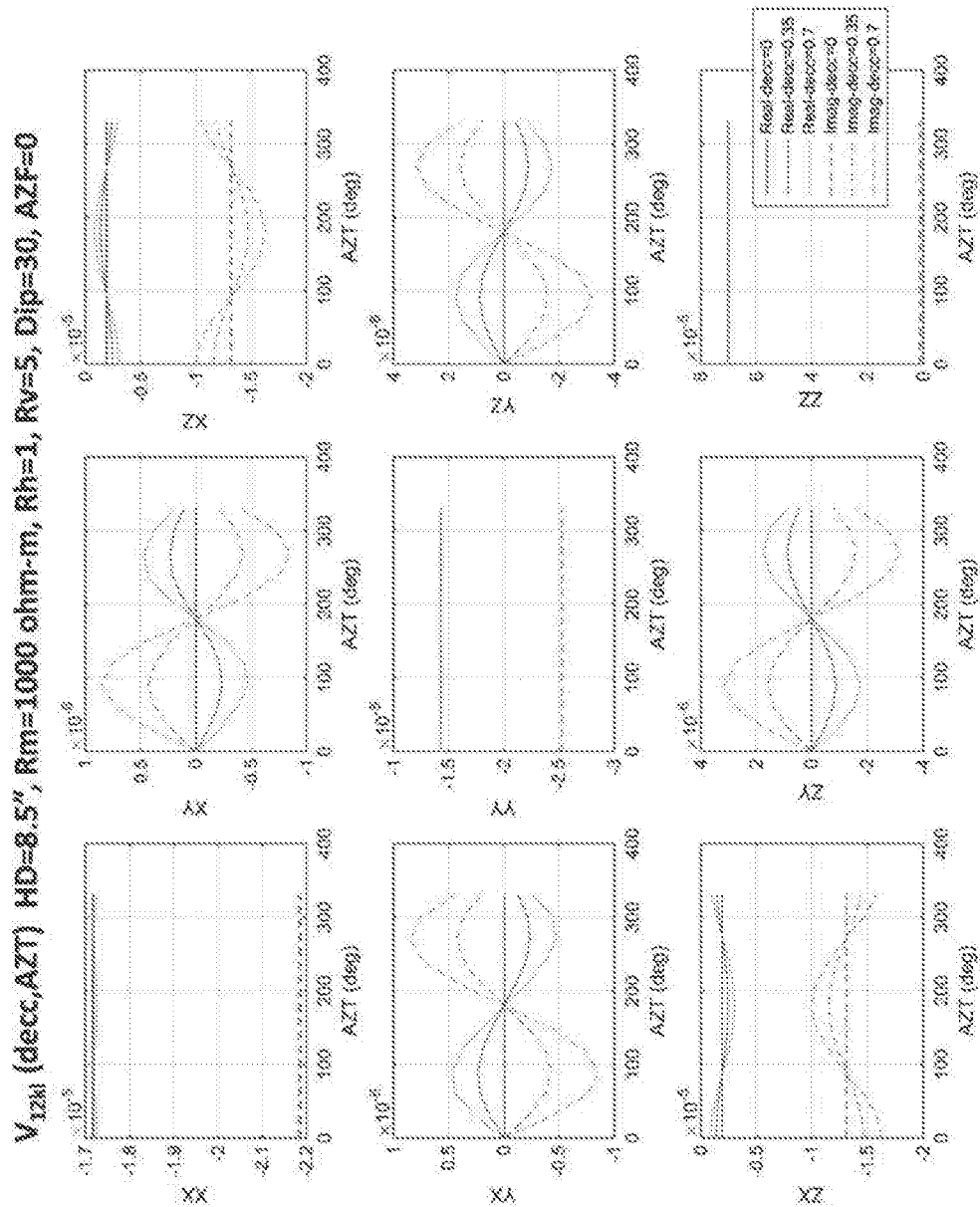
FIG. 4 includes graphs showing the variation of modeled transimpedance voltages as a function of tool position within the borehole.

Shown in FIG. 4 is an example showing the variation of modeled transimpedance voltages of a 6-in diameter multi-axial induction tool in an 8.5" borehole filled with oil based mud of 1000 ohm-m through an anisotropic formation with Rh=1 ohm-m, Rv=5 ohm-m, dip=30°, and dip azimuth (AZF)=0° as function of eccenter distance, decc, and eccenter azimuth (AZT or ψ). The horizontal axis is for the AZT and the vertical axis is the transimpedance voltages. Three decc values at 0 (representing a case where the tool is centered), 0.35" and 0.7" are presented as different curves. The real part of the voltage is shown as solid curves and the imaginary part is shown as dashed curves. This demonstrates that different components of the measured transimpedance voltages have different sensitivities to the position of the tool in the borehole. The off-diagonal components (XY, YX, XZ, ZX, YZ, ZY) have the highest sensitivity to the position of the tool in the borehole, and failure to correct these measured transimpedance voltages for the position of the tool in the borehole can result in poor accuracy. As shown, the XX and YY components have moderate sensitivity to the position of the tool in the borehole, and the ZZ component has the least sensitivity to the position of the tool in the borehole.

In order to accurately measure the formation properties, σh, σv, θ, and Φ, correction for the borehole effects is performed. To correct for the borehole effect, the parameters σmud, hd, decc, and ψ are either known or measured. The mud conductivity σmud and hole diameter hd can be considered to be nearly constant and may be known or measured during the relatively short data acquisition time window in which the components of the transimpedance coupling voltages Vijkl are measured. Due to random lateral tool motion in the borehole during data acquisition, the decenter distance, decc, and eccentering azimuth angle, ψ may be rapidly varying and unknown parameters within the data acquisition time window.

For example, a given tool may have 2 transmitters and 2 receiver stations (i=1,2 and j=1,2) and each transmitter or receiver station may include co-located multi-axial antenna coils in x, y, and z directions. A complete set of transimpedance coupling voltages Vijkl can be constructed from the following 6 antenna firing sub cycles:

TABLE 1

Typical firing sequence for obtaining a complete set of transimpedance coupling voltages

| Transmitter Firing Sub-cycles | Received Voltage Signals |
|---|---|
| T1x | $V_{11xx}, V_{11xy}, V_{11xz}, V_{12xx}, V_{12xy}, V_{12xz}$ |
| T1y | $V_{11yx}, V_{11yy}, V_{11yz}, V_{12yx}, V_{12yy}, V_{12yz}$ |
| T1z | $V_{11zx}, V_{11zy}, V_{11zz}, V_{12zx}, V_{12zy}, V_{12zz}$ |
| T2x | $V_{21xx}, V_{21xy}, V_{21xz}, V_{22xx}, V_{22xy}, V_{22xz}$ |
| T2y | $V_{21yx}, V_{21yy}, V_{21yz}, V_{22yx}, V_{22yy}, V_{22yz}$ |
| T2z | $V_{21zx}, V_{21zy}, V_{21zz}, V_{22zx}, V_{22zy}, V_{22zz}$ |

The 6 transmitter antenna coils are fired sequentially while the signals at the 6 receiver antenna coils are measured simultaneously. Assuming the transmitter signals are a 4 ms (0.004 second) tone burst and the receiving electronic uses an additional 16 ms for quiet time before it is ready for the next measurement, the duration for a given transmitter firing cycle is then 20 ms. It thus takes 120 ms to acquire a complete set of transimpedance coupling voltages Vijkl. If the tool's position in the borehole, as described by decc and ψ parameters, moves significantly during the 120 ms data acquisition time, different components in the measured signals Vijkl contain different degree of tool position effects as illustrated in FIG. 4. The tool motion in the borehole depends on many factors including the borehole assembly configuration, weight on bit, rotating speed (rpm), and rock mechanical properties.

The behavior of the tool vibration during drilling is complicated. Assuming the frequency of the random tool vibration in the borehole is close to the tool rotating frequency, for a LWD tool drilling at 120 rpm, within the 120 ms data acquisition time window the tool would move about ¼ of its vibration cycle, which means significant changes in decc and ψ parameters for the 6 firing listed in Table 1.

Figure 5:
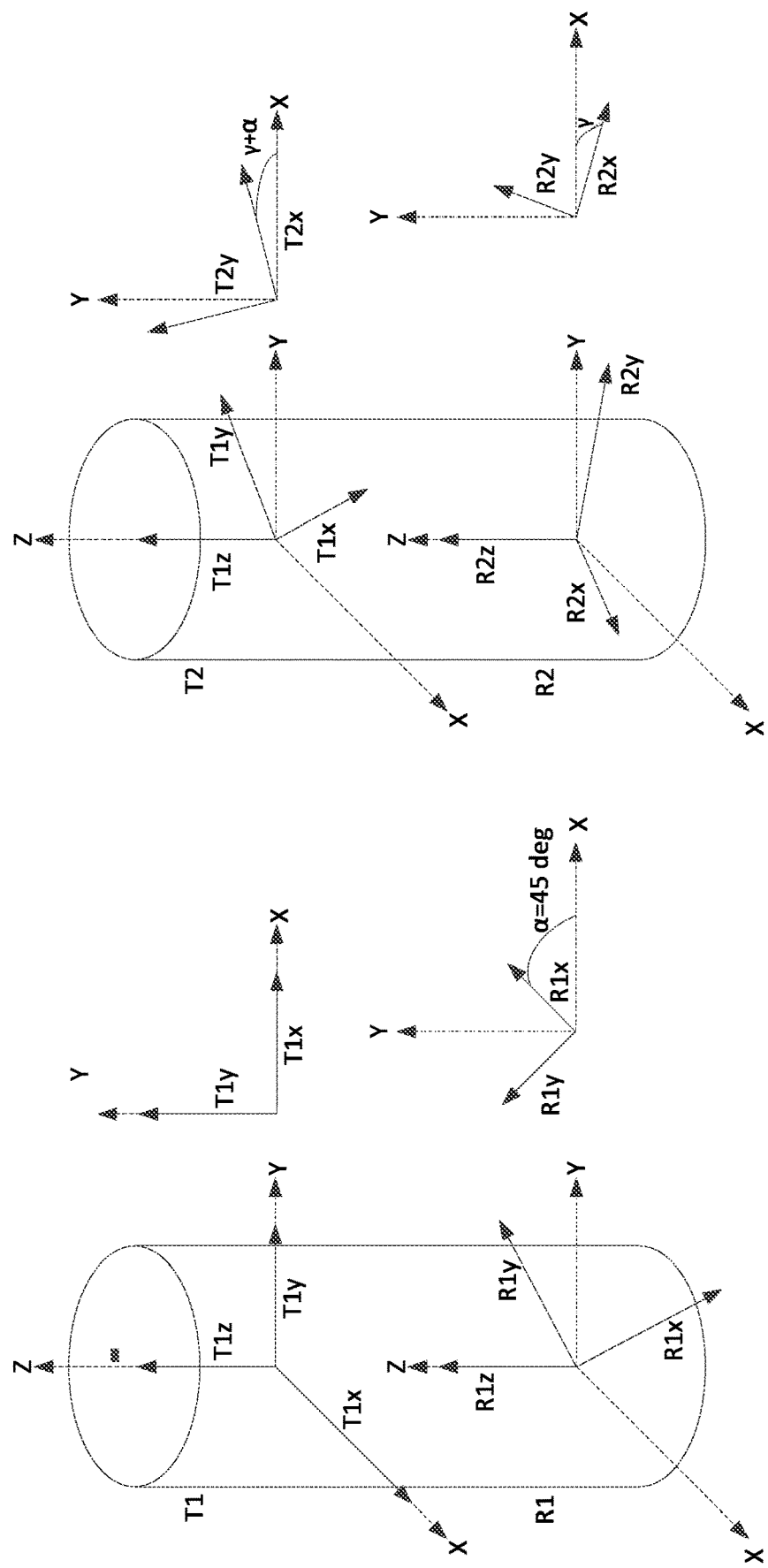
FIG. 5 shows example configurations of multi-axial measurement arrays such as may be in multi-axial induction resistivity logging tools like that of FIG. 1.

The behavior of the tool vibration during drilling will now be described in greater detail with reference to FIG. 5, which illustrates example embodiments of multi-axial measurement arrays. Depicted in FIG. 5 are two resistivity subs, sub1 and sub2, each having a triaxial transmitter and a triaxial receiver. The triaxial transmitter is labeled as T1 and the triaxial receiver is labeled as R1 in sub1, and the triaxial transmitter is labeled as T2 and the triaxial receiver is labeled as R2 in sub2. Thus in this case, the tool includes two transmitter and two receiver stations. Therefore, i=1,2 for indicating the transmitter stations and j=1,2 for indicating the receiver stations. There is a preset z-axis alignment angle α between the transmitter and receiver station. There is also an arbitrary alignment angle γ between sub 1 and sub 2. Here, the introduction of alignment angles α and γ could be arbitrary constant values. For example, the alignment angles α and γ can be zeros because due to the use of a single collar.

A triaxial tool configured as in FIG. 4 rotates azimuthally around its axis inside a borehole through a transverse isotropic (TI) anisotropic medium. The rotation is the nominal operating mode for logging while drilling (LWD). The center of the rotating tool assumes a different random position in the borehole for each transmitter firing sub-cycle. This random tool position can be modeled as decc and ψ assume values of the following random sequences, RUdecc and RUψ with uniform distributions:

$$RUdecc = \left(\frac{HD - TD}{2}\right) \times Rand(1, n) \qquad \text{Eq. (1)}$$

$$RU\psi = 360° \times Rand(1, n) \qquad \text{Eq. (2)}$$

Here HD is borehole diameter and TD is tool diameter. Rand(1,n) is an 1-dimensional pseudo random number series of length n with uniform distribution between 0 and 1. The n is the total number of firing sub-cycles during the data acquisition. For example, if 100 complete sets of transimpedance coupling voltage data are to be collected, then n=100×6=600. This type of random motion occurs in low angle wells where the tool is bouncing randomly around the center of the borehole.

The random tool position can instead be represented with normal distribution around a mean value and with a standard deviation by assuming the values of the following normally distributed random sequences, RNdecc and RNψ.

$$RNdecc = decc\_mean + decc\_std \times Randn(1, n) \qquad \text{Eq. (3)}$$
$$\text{if } \left(RNdecc > \left(\frac{HD - TD}{2}\right)\right), RNdecc = \left(\frac{HD - TD}{2}\right)$$
$$\text{if } (RNdecc < 0), RNdecc = 0$$

$$RN\psi = \text{Mod}([\psi_{mean} + \psi_{std} \times Randn(1, n)], 360) \qquad \text{Eq. (4)}$$

Figure 6:
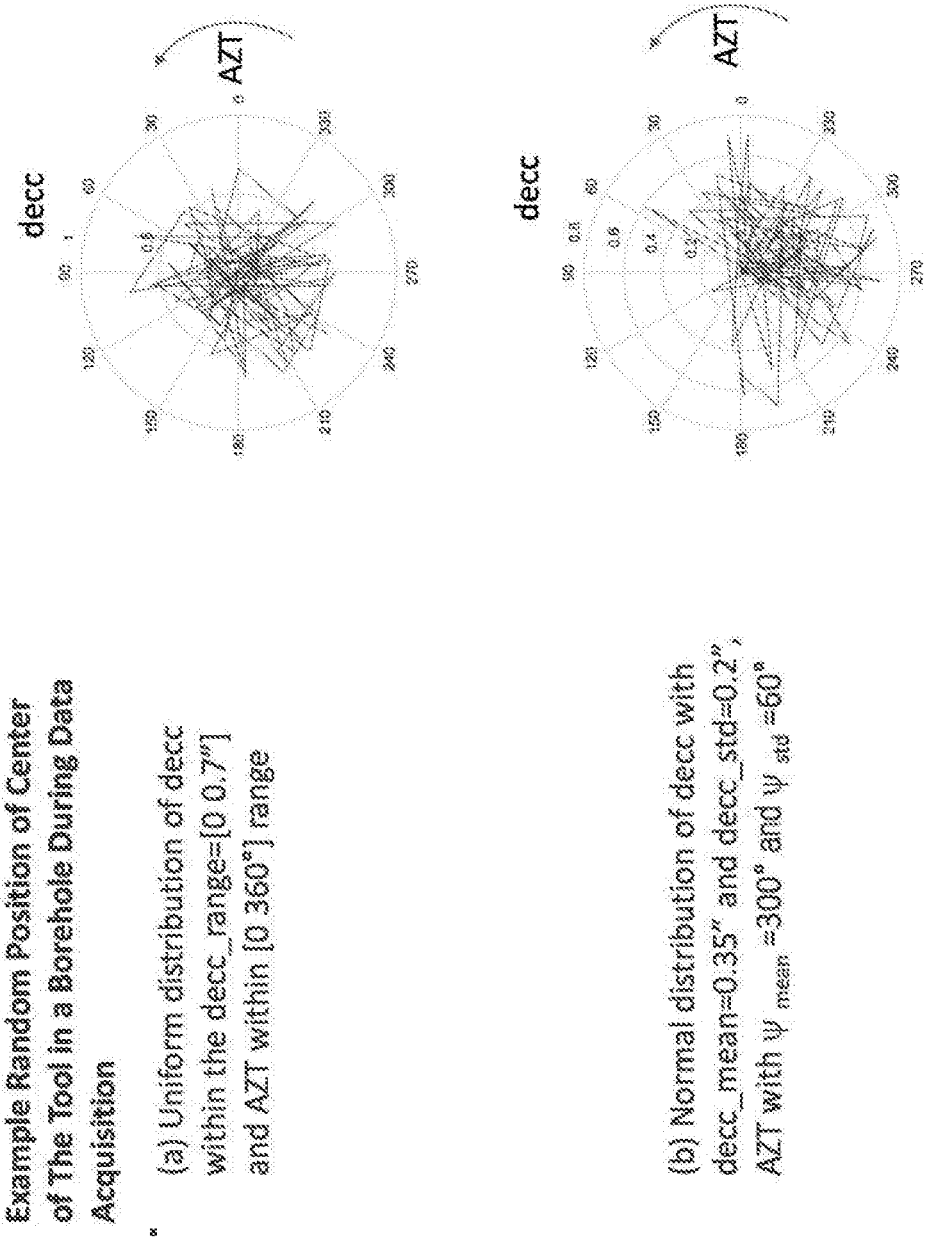
FIG. 6 includes graphs showing random tool motion within the borehole during drilling.

Here, the Randn(1,n) is a 1-dimensional pseudo number series of length n with a normal distribution. The mean and standard deviation of Randn(1,n) are 0 and 1, respectively, for a sufficiently large n. The RNdecc series from Eq. (3) has a mean value near decc_mean and a standard deviation near decc_std. The last two lines of Eq. (3) limit the value of the random series RNdecc to between the range of [0, (HD−TD)/2] which are the full range of possible decenter distance for given hole diameter and tool diameter. The normal distributed random sequence RNψ has a mean around $\psi_{mean}$ with standard deviation $\psi_{std}$. The value of RNψ is modulated to be within [0 360°] range. This type of random motion may occur in deviated wells where the tool is lying on the bottom of the hole and climbing the side of the borehole wall according to the rotation direction. Shown in FIG. 6 are examples of these two types of random tool motions.

With a data record of transimpedance voltages Vijkl generated while the tool position varies as per the equations (1) and (2), or (3) and (4), it would be difficult to invert for borehole/formation properties because there are not enough measurements from the same tool decc and ψ position. It is impractical to gather a complete data record at the same decc and ψ position because the values of these two parameters are unknown during data acquisition. Described below will be a workflow designed to overcome this difficulty and obtain accurate formation properties.

Figure 3:
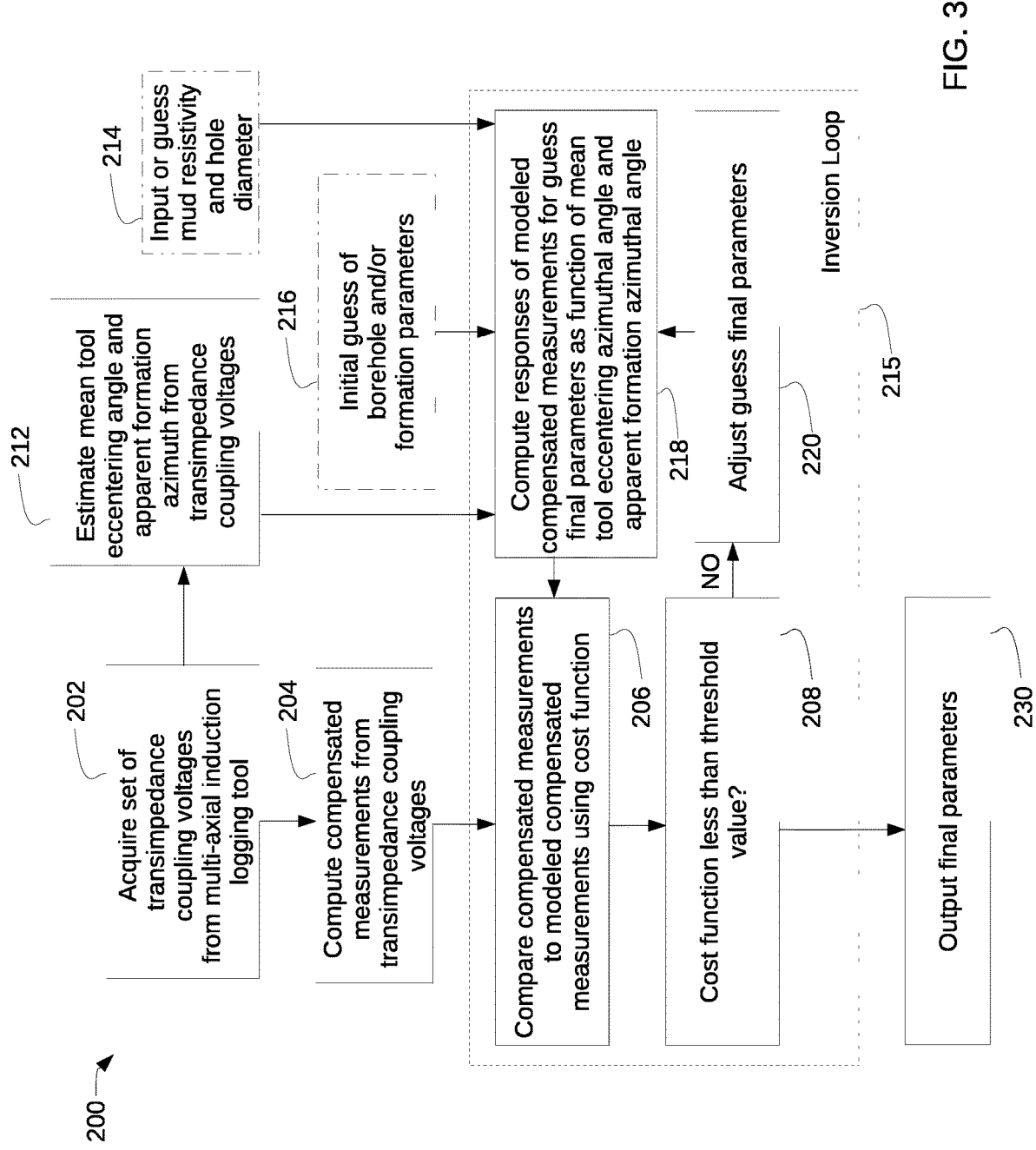
FIG. 3 is a flowchart showing a workflow for determining formation and borehole properties that are compensated for borehole effects, in accordance with the techniques described herein.

The workflow will now be described in general with reference to the flowchart 200 of FIG. 3, with a more detailed description following. The tool is rotated in the borehole as the transmitter is fired according to the cycle shown in Table 1. Thus, a set of transimpedance coupling voltages Vijkl is acquired (Block 202) by the computing circuitry (shown as 106 in FIG. 1), with either the controller (shown as 108 in FIG. 1) or the computing device (shown as 110 in FIG. 1) performing the acquisition. Before the transimpedance coupling voltages Vijkl are acquired, a number of data records Nrec appropriate for the expected drilling speed and depth sampling interval is determined. In some cases, a larger Nrec leads to more accurate results with smaller standard deviation of the measurements due to the random motion of the tool in the borehole. However, a larger Nrec implies a longer acquisition time at a given log point on the well depth scale. For a given drilling speed and a given depth sampling interval, the largest Nrec can be determined. For example, for a drilling speed of at 100 ft/hr, there are a total of 3600/200=18 seconds to acquire data at every 6-in depth interval. Assuming that it take 20 ms to acquire data at a firing sub-cycle, within 18 seconds the number of data records that can be acquires is Nrec=18000/20/6=150 for the example tool described in FIG. 5.

Fourier coefficients of the set of transimpedance coupling voltages Vijkl are computed using a least square process. Then, compensated measurements (described in detail below) are computed from Fourier coefficients, and thus the transimpedance coupling voltages, by the computing circuitry (Block 204). These compensated measurements are fed to the inversion loop 215, operation of which will be described below.

The mean tool eccentering azimuthal angle and apparent formation azimuth are estimated from the Fourier coefficients, and thus the transimpedance coupling voltages, by the comping circuitry (Block 212). The mean tool eccentering azimuthal angle is estimated by calculating azimuthally variant symmetrized measurements as a function of the Fourier coefficients, and then estimating the mean tool eccentering angle as a function of the symmetrized measurements. The apparent formation azimuthal angle is estimated by computing azimuthally variant anti-symmetrized measurements as a function of the Fourier coefficients, and then estimating the apparent formation azimuthal angle as a function of the anti-symmetrized measurements.

The mean tool eccentering angle and apparent formation azimuth are fed to the inversion loop 215. Optionally, mud resistivity and hole diameter guesses are fed to the inversion loop (Block 214). In addition, initial guesses of borehole and/or formation parameters are also optionally fed to the inversion loop (Block 216). In some cases, the mean tool eccentering distance may be estimated as a function of symmetrized measurements compensated for transmitter and receiver gains and the mean tool eccentering angle. The compensated symmetrized measurements are also calculated as a function of the Fourier coefficients. Performance of these optional steps helps to reduce the number of iterations performed by the inversion loop to reach a final answer for the borehole and/or formation parameters.

The inversion loop 215 includes the computing of responses of modeled compensated measurements for guess final parameters as a function of the estimated mean tool eccentering azimuthal angle and apparent formation azimuthal angle (Block 218). These modeled responses are computed with the use of a forward model engine that is executed. It computes the model responses for the compensated measurements from tool data for the given borehole/formation parameters: Rh, Rv, Dip, decc, Rm, HD, $\Psi_{mean}$ and AZT. In this list of parameters, some parameters, such as Rm, HD (for the case of not inverting Rm and HD), $\Psi_{mean}$ and AZT, are treated as known and not to be inverted. The remaining parameters, Rh, Rv, Dip, and decc, are called free parameters to be inverted. Finite element code may be used to generate model responses, although it may be too slow for real-time application. The finite element code therefore may be used to pre-compute a multi-dimensional response table in which each dimensions corresponding to a borehole/formation parameter. The response table can be stored so that the model responses at arbitrary borehole/formation parameter values could be quickly computed through interpolation. The forward model engine could also be used in Block 220 to compute the derivative of responses with respective to any given free parameter.

The inversion loop 215 then proceeds with the comparison of these modeled compensated measurements to the computed compensated measurements (from Block 204) using a cost function (Block 206). The cost function is designed to have a decreasing value when the model measurements match close to the tool measurements. The cost function reaches zero when the model measurements match exactly to the corresponding tool measurements. The cost function is generally written as a quadratic form of the difference between the tool measurements and model responses. Shown in Eq. (45) is an example cost function.

$$C = \frac{1}{nc}\sum_{i=1}^{nc} w_i(CT_i - CM_i)^2 \qquad \text{Eq. (45)}$$

Alternatively, the cost function could also be defined as:

$$C = \frac{1}{nc}\sum_{i=1}^{nc} w_i \text{abs}(CT_i - CM_i) \qquad \text{Eq. (46)}$$

Both Eq. (45) and (46) would work with but minor difference in robustness. Here C represents the cost function for matching nc compensated measurements:
$CT_i$, i=1, . . . , nc are compensated measurements from the tool data generated at block 5
$CM_i$, i=1, . . . , nc are the corresponding modeled compensated measurements generated at block 7
where $w_i$ is the weighting coefficient for the i-th compensated measurement.

For example, $CT_i$ could be the following compensated quantities:

real($TBT(\overline{V}_{ijkl})$)=real($C\overline{V}_{kl}$), imag($TBT(\overline{V}_{ijkl})$)=imag($C\overline{V}_{kl}$), $CR\overline{V}_{kl}, CI\overline{V}_{kl}, CA\overline{V}_{kl}, CP\overline{V}_{kl}, k,l=x,y,z$ real($CXXPYY$)=real($TBT(xxpyy_{ij})$), imag($CXXPYY$)=imag($TBT(xxpyy_{ij})$), real($CXXMYY$)=real($TBT(xxmyy_{ij})$), imag($CXXMYY$)=imag($TBT(xxmyy_{ij})$), real($CXYPYX$)=real($TBT(xypyx_{ij})$), imag($CXYPYX$)=imag($TBT(xypyx_{ij})$), real($CXYMYX$)=real($TBT(xymyx_{ij})$), imag($CXYMYX$)=imag($TBT(xymyx_{ij})$),

CRXXPYY, CIXXPYY, CRXXMYY, CIXXMYY, CRXYPYX, CIXYPYX, CRXYMYX, CIXYMYX

Additional regularization terms may optionally be added to the cost function to obtain smoother outputs for noisy input data condition.

If the cost function is less than a threshold value (Block 208), indicating an acceptable fit between the modeled compensated measurements and the computed compensated measurements, then final parameters based on the guess final parameters are output (Block 230). During the comparison, the size of the cost function is checked to see whether it is smaller than a pre-determined convergent value, $C_{convergent}$, also referred to as a threshold value.

If the cost function is greater than the threshold value (Block 208), indicating an unacceptable fit between the modeled compensated measurements and the computed compensated measurements, then the guess final parameters are adjusted (Block 220), the responses of the modeled compensated measurements are recomputed for the adjusted guess final parameters, and the comparison is made again (Block 206). The guess final parameters are adjusted using iteration techniques such as the Levenberg and Marquardt algorithm, or the Gauss-Newton method.

The number of times the algorithm loops through Block 206, $N_{loop}$, is recorded and will be used as part of the loop termination conditions. If the cost function is smaller than the convergent value, the match between model measurements and the corresponding tool measurements is considered to be acceptably close and the algorithm will terminate the loop. At this time, the final borehole/formation parameters are considered to be the solutions according to the model used in Block 218. The loop exiting criteria may include, but are not limited to:

(a) Number of iterations $N_{loop}$>Nmax
(b) Cost function C<$C_{convergent}$ (usually a very small constant)
(c) Difference between two successive cost function $\Delta C = C_{Nloop} - C_{Nloop-1} < \varepsilon$ (also a very small constant).

The final parameters may include conductivity of the mud in the borehole, the diameter of the borehole, horizontal resistivity of the formation, vertical resistivity of the formation, formation dip, final mean tool eccentering azimuthal angle, final mean apparent formation azimuthal angle, and final mean tool eccentering distance. Indeed, the final parameters may include any borehole/formation parameter values from the final loop and also the final cost function value and the loop counter. The final formation parameters Rh, Rv, Dip, and AZT represent the inverted formation properties from the multi-axial data at the depth sample point where the Nrec data is collected. The final decc parameter (decc_mean=decc) together with $\Psi_{mean}$ represent the mean tool position at the depth sample point. If inversion was performed for Rm and HD, the final Rm and HD parameters represent the inverted mud resistivity and borehole diameter. These formation properties are obtained through a model that accounts for the effects of the tool which moves randomly in the borehole during data acquisition. The values of these properties are considered to be borehole corrected. The final cost function $C_{Nloop}$ and the loop counter $N_{loop}$ can be used to indicate the quality of the inversion. $C_{Nloop}$ represents the mean square data matching error. Lower $C_{Nloop}$ value represents relatively higher quality for the inverted parameters. A large $N_{loop}$ generally indicates the inversion process has had difficulty converging. If $N_{loop}$=Nmax, the process is not converged. In this case of a lack of convergence, the accuracy of the inverted parameters may not be valid or accurate.

Details of the estimation of mean tool eccentering azimuthal angle and apparent formation azimuthal angle, together with details of the determination of the compensated measurements, will now be given.

A set of N records, Nrec, of complete 9-component transimpedance coupling voltages (Vijkl, i, j=1,2, k,l=x,y,z) sets can be acquired by repeating the firing sub-cycle listed in Table 1 Nrec times. At each firing sub-cycle, the tool phase angle ($\phi$) is measured. Let Vijklm be the m-th record transimpedance coupling voltages measured at the associated tool phase angle $\phi_{ijklm}$, m=1,2, . . . Nrec. It should be noticed that some subsets of the coupling voltages have the same tool phase angle. For example, $V_{11xxm}$, $V_{11xym}$, $V_{11xzm}$, $V_{12xxm}$, $V_{12xym}$, and $V_{12xzm}$ are acquired simultaneously by firing T1x transmitter. Therefore, $\phi_{11xxm}$, $\phi_{11xym}$, $\phi_{11xzm}$, $\phi_{12xxm}$, $\phi_{12xym}$, and $\phi_{12xzm}$ have the same value. From the Nrec records of the transimpedance coupling voltages, each component Vijkl can thus be written as a function of tool phase angle $\phi$.

$$Vijkl(\phi_{ijklm}), m=1,2, \ldots Nrec \qquad \text{Eq. (5)}$$

The firing cycle may have sufficient jitter with respect to the rotation cycle of the tool. Therefore, the $\phi_{ijklm}$, m=1,2, . . . Nrec, usually is in a random order with good coverage for the full range of the tool phase, i.e., the value is distributed randomly over the entire tool phase angle range of [0 360°].

The measured transimpedance coupling voltage between a given transmitter coil and a given receiver coil can be written as harmonic function of the tool phase angle as:

$$V_{ijkl} = V_{DC\_ijkl} + V_{FHC\_ijkl}\cos(\ )+V_{FHS\_ijkl}\sin(\ )+V_{SHC\_ijkl}\cos(2)+V_{SHS\_ijkl}\sin(2) \qquad \text{Eq. (6)}$$

where $V_{DC\_ijkl}$ is the coefficient for the DC term, $V_{FHC\_ijkl}$ and $V_{FHS\_ijkl}$ are the coefficients for the first harmonic cosine and sine terms respectively, and $V_{SHC\_ijkl}$ and $V_{SHS\_ijkl}$ are the coefficients for the second harmonic cosine and sine terms respectively.

The Fourier coefficients in Eq. (6) can be obtained through a least square curve fitting algorithm from a collection of voltage data points $V_{ijklm}$ m=1,2, . . . Nrec, sampled randomly at $\phi_{ijklm}$. This least square fitting process offers an advantage of ensample averaging over the collection of data records used in the fitting to reduce the effect of random tool motion during data acquisition and intrinsic instrumentation random noise.

One example of least square algorithm to obtain the coefficients is now described. Let $Z(\phi, C_{ijkl})$, which is a function of tool phase angle $\phi$ and coefficient array $C_{ijkl}$, represent the measured transimpedance coupling voltage $V_{ijkl}$ in Eq. (6). Here array $C_{ijkl}$ contains the 5 Fourier coefficients in Eq. (6).

$$Y = [Z_1, \ldots, Z_{N_{rec}}]^T \qquad \text{Eq. (7)}$$

$$Z_m = Z(\phi_m, C_{ijkl}) = \sum_{n=1}^{5} C_{ijkl}(n) f_n(\phi_m), m = 1, \ldots N_{rec}$$

$$C_{ijkl} = [V_{DC\_ijkl}, V_{FHC\_ijkl}, V_{FHS\_ijkl}, V_{SHC\_ijkl}, V_{SHS\_ijkl}]^T$$

$$f = [1, \cos(\phi), \sin(\phi), \cos(2\phi), \sin(2\phi)]$$

Taking the derivative of $Z(\phi_m, C_{ijkl})$ w.r.t. $C_{ijkl}(n)$ yields:

$$\Gamma_{nm} = \frac{\partial Z(\phi_m, C_{ijkl})}{\partial C_{ijkl}(n)} = f_n(\phi_m) \qquad \text{Eq. (8)}$$

where the $\Gamma$ in Eq. (8) is called a Gramian matrix.

The least square solution for the coefficient $C_{ijkl}$ can then be written in matrix notation as:

$$C_{ijkl} = (\Gamma\Gamma^T)^{-1}\Gamma Y \qquad \text{Eq. (9)}$$

The five Fourier coefficients in $C_{ijkl}$, which contain the averaging effect, can be shown later to be close to those from transimpedance coupling voltage measurements of the tool stationed at the mean position. The coefficients in $C_{ijkl}$ can also be used to estimate the mean position of the tool in the borehole during the time window in which the Nrec records are collected. The Fourier coefficients in $C_{ijkl}$ can then be used to invert accurately for formation properties ($\sigma h$, $\sigma v$, $\theta$, $\Phi$) using a model in which the tool is fixed at certain mean position defined by decc=decc_mean and $\psi=\psi_{mean}$. In this way, the difficulty of dealing with the borehole effect of the tool at certain unknowable position in the borehole is overcome by solving for the mean position of the tool first and then inverting for formation ($\sigma h$, $\sigma y$, $\theta$, $\Phi$) using a model with tool at the mean position.

Using the Fourier coefficients $C_{ijkl}$, several types of compensated measurements can be constructed. The compensated symmetrized (SX and SY) and anti-symmetrized (AX and AY) measurements related to x and y components are defined as the following:

$$SX \stackrel{def}{=} CZX - CXZ \qquad \text{Eq. (10)}$$

$$AX \stackrel{def}{=} CZX + CXZ \qquad \text{Eq. (11)}$$

$$SY \stackrel{def}{=} CZY - CYZ \qquad \text{Eq. (12)}$$

$$AY \stackrel{def}{=} CZY + CYZ \qquad \text{Eq. (13)}$$

where, $$CZX \stackrel{def}{=} \sqrt{\frac{V_{FHC\_12ZX}}{V_{DC\_11ZZ}} \frac{V_{FHC\_21XZ}}{V_{DC\_22XX}}} \qquad \text{Eq. (14)}$$

$$CXZ \stackrel{def}{=} \sqrt{\frac{V_{FHC\_12XZ}}{V_{DC\_11XX}} \frac{V_{FHC\_21ZX}}{V_{DC\_22ZZ}}} \qquad \text{Eq. (15)}$$

$$CZY \stackrel{def}{=} \sqrt{\frac{V_{FHC\_12ZY}}{V_{DC\_11ZZ}} \frac{V_{FHC\_21YZ}}{V_{DC\_22YY}}} \qquad \text{Eq. (16)}$$

$$CYZ \stackrel{def}{=} \sqrt{\frac{V_{FHC\_12YZ}}{V_{DC\_11YY}} \frac{V_{FHC\_21ZY}}{V_{DC\_22ZZ}}} \qquad \text{Eq. (17)}$$

The measurements CZX, CXZ, CZY, CYZ, SX, AX, SY, and AY are gain compensated quantities, i.e., the transmitter and receiver gains associated with the measurements are cancelled out. The measurements are also designed to preserve the azimuthal properties of the measurements and therefore can be used to estimate the formation dip azimuth (AZF) and tool eccentering azimuth (AZT).

Using the compensated symmetrized and anti-symmetrized measurements in Eq. (10) through (13), the apparent formation azimuth ($AZF_{app}$) and tool eccentering azimuth ($AZT_{app}$) can be estimated using the following formula in Eq. (18) and (19). The $AZF_{app}$ and $AZT_{app}$ thus obtained are the relative angle spanned between the tool's x-axis and the formation dip azimuth and tool eccentering azimuth direction, respectively.

$$AZF_{app} = \text{Mod}(+a\tan 2(\text{imag}(AY), \text{imag}(AX))*180/\pi, 360) = IAA \qquad \text{Eq. (18)}$$

$$AZT_{app} = \text{Mod}(-a\tan 2(\text{imag}(SY), \text{imag}(SX))*180/\pi, 360) = ISA \qquad \text{Eq. (19)}$$

Here Mod(a, m) is modulo function returns the remainder after division of a by m and function a tan 2(Y, X) is the Four-Quadrant Inverse Tangent of Y and X. The imag(x) is the symbol for imaginary part of the argument x. Here, $AZF_{app}$ is abbreviated as IAA because it is an angle derived from imaginary of anti-symmetrized measurements. Similarly, $AZT_{app}$ is abbreviated as ISA because it is an angle derived from imaginary of symmetrized measurements.

With the symmetrized measurement SX or SY, the tool eccentering distance, decc, can be expressed as the following linear relation.

$$decc = decc_m \times \left(\frac{\text{imag}(SX(AZT_{app}=0))}{\text{imag}(SX_m)}\right) \qquad \text{Eq. (20)}$$

or, $$decc = decc_m \times \left(\frac{\text{imag}(SY(AZT_{app}=0))}{\text{imag}(SY_m)}\right) \qquad \text{Eq. (21)}$$

where $$decc_m = \frac{BS - DTool}{2}$$

is the maximum eccentering distance for the given bit size, BS, and tool diameter, DTool, combination. $SX_m$ and $SY_m$ are the model SX and SY value, respectively, with decc=$decc_m$ and $AZT_{app}$=0.

Using the Fourier coefficients Cijkl, we can also define the following quantities in which the gain factors associated with the components are the same and can be factored out.

$$xxpyy_{ij} = V_{DC\_ijxx} + V_{DC\_ijyy} \qquad \text{Eq. (22)}$$

$$xxmyy_{ij} = 0.5 \times (V_{SHC\_ijxx} V_{SHC\_ijyy}, V_{SHS\_ijyx} V_{SHS\_ijxy}) \qquad \text{Eq. (23)}$$

$$xymyx_{ij} = V_{DC\_ijxy} V_{DC_{ijyx}} \qquad \text{Eq. (24)}$$

$$xypyx_{ij} = 0.5 \times (V_{SHC\_ijxy} + V_{SHC\_ijyx} + V_{SHS\_ijxx} V_{SHS\_ijyy}) \qquad \text{Eq. (25)}$$

$$\overline{V}_{ijxx} = 0.5 \times (xxpyy_{ij} + xxmyy_{ij}) \qquad \text{Eq. (26)}$$

$$\overline{V}_{ijyy} = 0.5 \times (xxpyy_{ij} + xxmyy_{ij}) \qquad \text{Eq. (27)}$$

$$\overline{V}_{ijxy} = 0.5 \times (xypyx_{ij} + xymyx_{ij}) \qquad \text{Eq. (28)}$$

$$\overline{V}_{ijyx} = 0.5 \times (xypyx_{ij} xymyx_{ij}) \qquad \text{Eq. (29)}$$

$$\overline{V}_{ijxz} = 0.5 \times (V_{FHC\_ijxz} V_{FHS\_ijyz}) \qquad \text{Eq. (30)}$$

$$\overline{V}_{ijzx} = 0.5 \times (V_{FHC\_ijzx} V_{FHS\_ijzy}) \qquad \text{Eq. (31)}$$

$$\overline{V}_{ijyz} = 0.5 \times (V_{FHS\_ijxz} + V_{FHS\_ijxz}) \qquad \text{Eq. (32)}$$

$$\overline{V}_{ijzy} = 0.5 \times (V_{FHS\_ijzy} + V_{FHS\_ijzx}) \qquad \text{Eq. (33)}$$

$$\overline{V}_{ijzz} = V_{DC\_ijzz} \qquad \text{Eq. (34)}$$

The $\overline{V}_{ijkl}$ quantities in Eq. (26)-(34) are derived from the Fourier coefficients and can be related to transimpedance coupling voltages $V_{ijkl}$ measured by the tool as if stationary at the mean position of the borehole.

The quantities $\overline{V}_{ijkl}$ contain transmitter and receiver gains. In order to use these measured quantities to invert for formation properties, such as horizontal and vertical conductivities ($\sigma h$, $\sigma v$), relative dip angle ($\theta$) and the dip azimuthal direction (AZF), accurate and stable calibrations for the transmitters and receivers are used. However, accurate and stable calibrations for all the transmitters and receivers are very expensive and difficult to achieve under the operating condition of the tool. Alternatively, compensated measurements can be designed in which the transmitter and receiver gains are cancelled out. For example, a term-by-term (TBT) compensation operator $TBT(X_{ij})$ can be defined that operates on any measurement between transmitter station i and receiver station j, $X_{ij}$ which contains a common gain factor. Mathematically, thus can be represented as:

$$TBT(X_{ij}) = \sqrt{\frac{X_{12}}{X_{11}} \times \frac{X_{21}}{X_{22}}} \qquad \text{Eq. (35)}$$

$TBT(X_{ij})$ produces a gain independent quantity because the gain factors associated with the measurements in the numerator are T1 k-coil, R2 l-coil, T2 k-coil, and R1 l-coil while the gain factors associated with the measurements in the denominator are T1 k-coil, R1 l-coil, T2 k-coil, and R2 l-coil, which cancel out exactly those from the numerator.

Using the TBT operators, compensated measurements from k-direction transmitter and l-direction receiver can be obtained from triaxial stations 1 and 2. Mathematically, this can be represented as:

$$TBT(\overline{V}_{ijkl}) = \sqrt{\frac{\overline{V}_{12kl}}{\overline{V}_{11kl}} \times \frac{\overline{V}_{21kl}}{\overline{V}_{22kl}}} = C\overline{V}_{kl},$$

k and l take on x, y, z directions $$TBT(\text{real}(\overline{V}_{ijkl})) = CR\overline{V}_{kl},$$

k and l take on x, y, z directions $$TBT(\text{imag}(\overline{V}_{ijkl})) = CI\overline{V}_{kl},$$

k and l take on x, y, z directions $$TBT(\text{abs}(\overline{V}_{ijkl})) = CA\overline{V}_{kl},$$

k and l take on x, y, z directions $$TBT(\text{phase}(\overline{V}_{ijkl})) = CP\overline{V}_{kl}, \qquad \text{Eq. (36)}$$

k and l take on x, y, z directions

Here, $C\overline{V}_{kl}$ is a complex quantity and $CR\overline{V}_{kl}$, $CI\overline{V}_{kl}$, $CA\overline{V}_{kl}$, $CP\overline{V}_{kl}$ are real quantities. The symbols real( ), imag( ), abs( ) and phase( ) represent taking the real part, imaginary part, absolute value and phase angle, respectively, of the complex quantity inside( ).

In fact, any suitable measurements, such as those defined in Eq. (22) through (34), which contain one common gain factor can be placed into the TBT operator defined in Eq. 35 and used to obtain a compensated measurement.

Unlike the compensated measurements defined in Eq. (10) though (17), which preserve the azimuthal properties of the measurements, most of the ($C\overline{V}_{kl}$) quantities are azimuthal invariant. After obtaining the formation azimuth and mean tool eccentering azimuth using Eq. (18) and (19), it would be highly desirable to have measurements which are azimuthal invariant, i.e. its property depends on other formation properties, such as horizontal and vertical conductivities (σh, σv), relative dip angle (θ). For the purpose of inverting for the formation properties, using azimuthal invariant measurements could greatly enhance the robustness of the inversion process.

For a centered tool, the off-diagonal terms of $C\overline{V}_{kl}$, namely $C\overline{V}_{xz}$, $C\overline{V}_{zx}$, $C\overline{V}_{yz}$, $C\overline{V}_{zy}$, $C\overline{V}_{xy}$, and $C\overline{V}_{yx}$, are azimuthally invariant. The $C\overline{V}_{zz}$ term which contains DC components will also be azimuthally invariant. The remaining terms $CZ_{xx}$ and $CZ_{yy}$, however, will not be azimuthal invariant. So for xx and yy responses, the following compensated quantities, which are azimuthal invariant, can be used instead of $CZ_{xx}$ and $CZ_{yy}$.

$$CRXXPYY = \qquad \text{Eq. (37)}$$

$$TBT(\text{real}(xxpyy_{ij})) = \sqrt{\frac{\text{real}(xxpyy_{12})}{\text{real}(xxpyy_{11})} \times \frac{\text{real}(xxpyy_{21})}{\text{real}(xxpyy_{22})}}$$

$$CIXXPYY = TBT(\text{imag}(xxpyy_{ij})) =$$

$$\sqrt{\frac{\text{imag}(xxpyy_{12})}{\text{imag}(xxpyy_{11})} \times \frac{\text{imag}(xxpyy_{21})}{\text{imag}(xxpyy_{22})}}$$

$$CRXXMYY = TBT(\text{real}(xxmyy_{ij})) =$$

$$\sqrt{\frac{\text{real}(xxmyy_{12})}{\text{real}(xxmyy_{11})} \times \frac{\text{real}(xxmyy_{21})}{\text{real}(xxmyy_{22})}}$$

$$CIXXMYY = \qquad \text{Eq. (38)}$$

$$TBT(\text{imag}(xxmyy_{ij})) = \sqrt{\frac{\text{imag}(xxmyy_{12})}{\text{imag}(xxmyy_{11})} \times \frac{\text{imag}(xxmyy_{21})}{\text{imag}(xxmyy_{22})}}$$

For an eccentered tool position, the following compensated quantities which are nearly azimuthally invariant can be obtained:

$$CRXXPYY = TBT(\text{real}(xxpyy_{ij}))$$

$$CIXXPYY = TBT(\text{imag}(xxpyy_{ij})) \qquad \text{Eq. (39)}$$

$$CRXYMYX = TBT(\text{real}(xymyx_{ij}))$$

$$CIXYMYX = TBT(\text{imag}(xymyx_{ij})) \qquad \text{Eq. (40)}$$

$$CRZ = TBT(\text{real}(\overline{V}_{ijzz})) \qquad \text{Eq. (41)}$$

Multiple examples of the results provided by the techniques described above will now be given. The first is an example where the tool has a 6 inch diameter and moves randomly with a uniform distribution around the center of an 8.5 inch borehole. The 8.5 inch diameter borehole is filled with Rm=1000 ohm-m oil based mud and the formation outside the borehole is anisotropic with Rh=1 ohm-m, Rv=5 ohm-m, and the dip is 30°. Twelve cases of dip azimuth from 0° to 330° with increment of 30° are modeled and discussed below. For each case, 360 complete transimpedance voltage sets (Nrec=360) have been generated as a 6-in diameter tool is rotating and assuming random decc and ψ values according to Eq. (1) and (2). The n in Eq. (1) and (2) for these Nrec record is n=Nrec*6 because each record has 6 firing subcycles.

Figure 7:
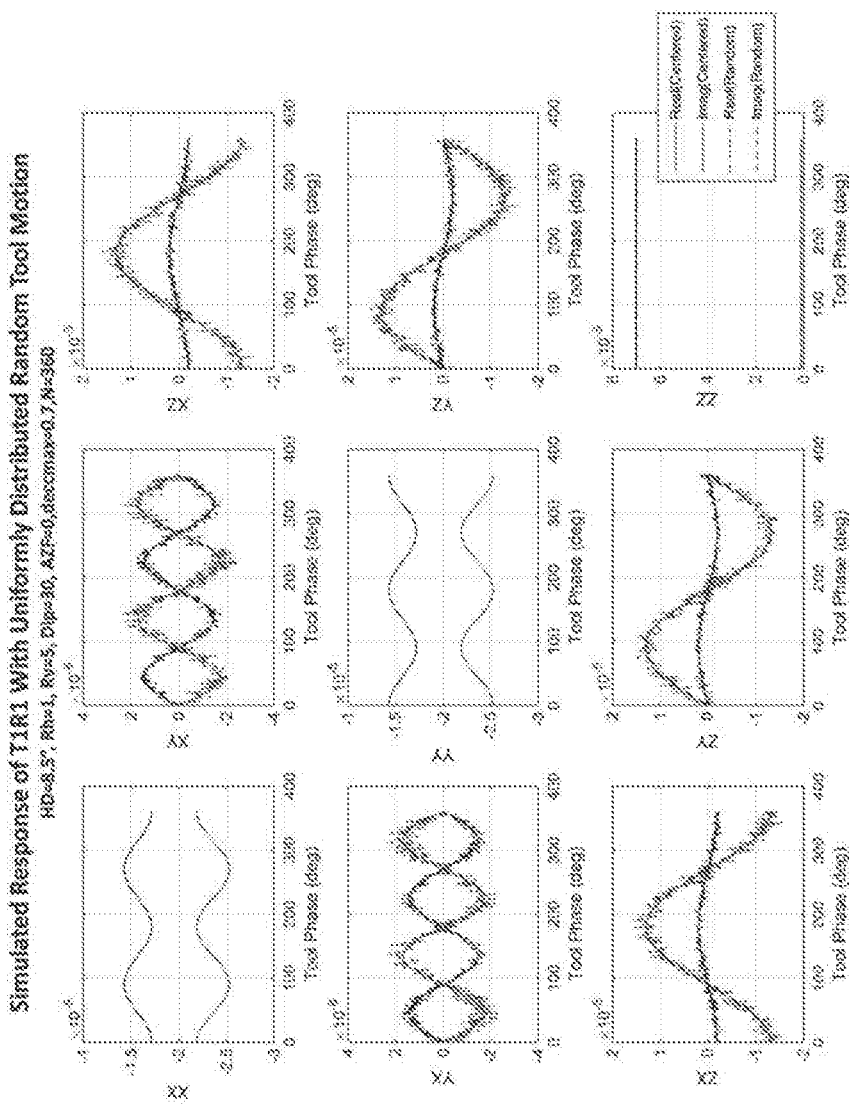
FIG. 7 includes graphs showing simulated tool response as function of tool phase angle.

Shown in FIG. 7 are plots of simulated near spacing (T1R1) data records as function of tool phase angle for the case of AZF=0°. The real part of the measurement is blue dash curve and imaginary part red dash curve. For reference purpose, the real and imaginary of the measurements from mean (centered) position are plotted as solid blue and red, respectively. The measurements with random tool motion behave like an additive noise on the corresponding measurements from mean tool position. The standard deviation of such random motion induced "noise" can be computed as the standard deviation between the measurement and the corresponding one from the mean position tool. Notice that the size of random motion induced noise is very small for the diagonal components, XX, YY, and ZZ, consistent with the expectation derived from the modeled tool position effect in FIG. 4.

Figure 8:
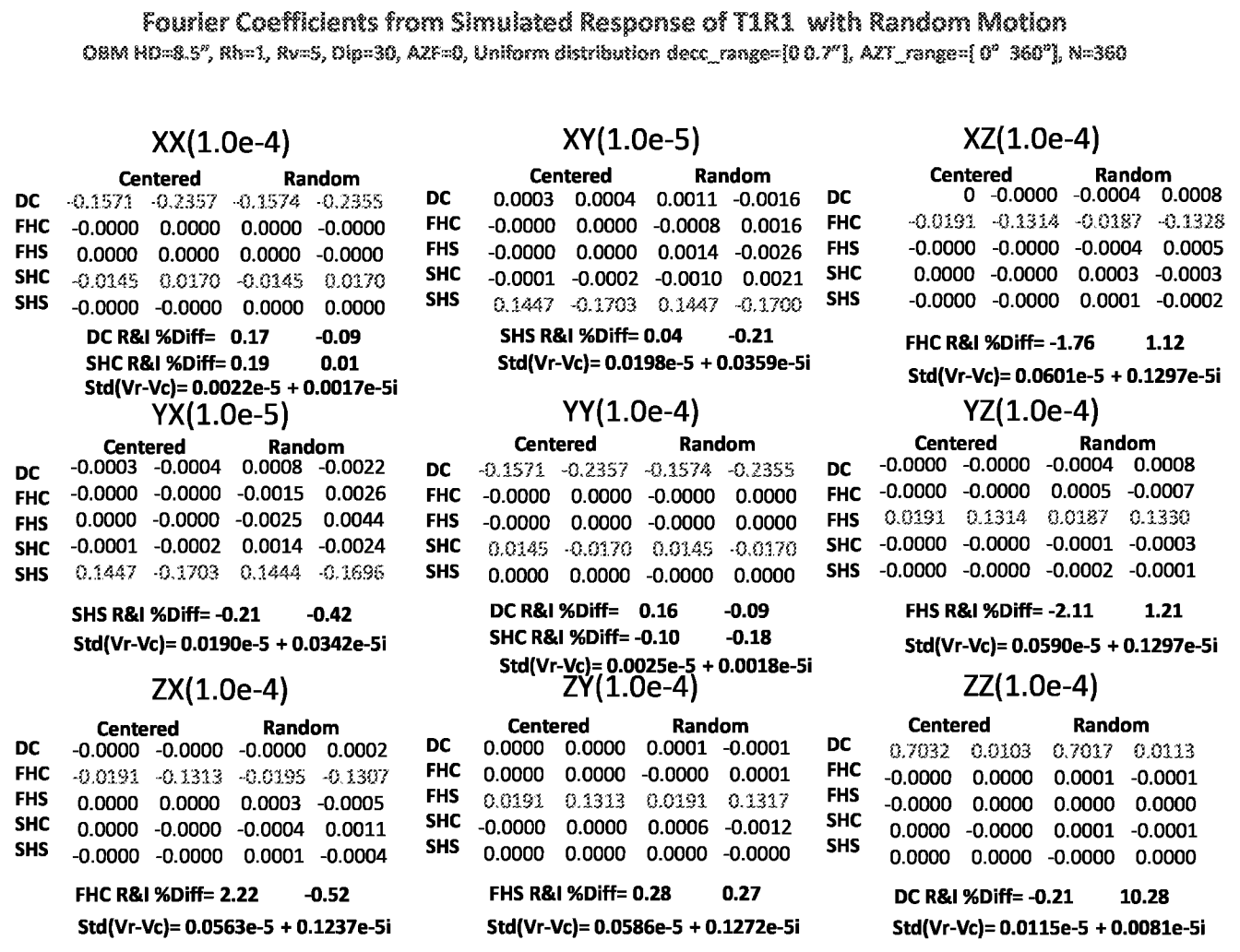

The data on FIG. 7 is fed to the least square algorithm Eq. (7)-(9) to obtain the first 5 Fourier coefficients, namely DC, first harmonic cosine (FHC), first harmonic sine (FHS), second harmonic cosine (SHC), and second harmonic sine (SHS). Shown in FIG. 8 are the Fourier coefficients obtained from the simulated data record. There are two columns each under "Centered" and "Random" heading. Listed under the first column are the real parts of the Fourier coefficients and under the second column are imaginary parts of the coefficients. Also listed are the standard deviation of the difference between the measurements with random tool motion and those from mean position. The percentage difference between the significant Fourier coefficients (in red color) from the measurements with random tool motion and those at the center of the borehole are also tabulated. For example, for XX component DC R&I % Diff=0.17–0.09 means the percentage difference between random and mean of the real and imaginary of DC coefficient are 0.17% and −0.09%, respectively. The next line Std(Vr−Vc)=0.0022e-5+ 0.0017e-5 means the computed standard deviation between the model measurements with random tool motion and those from mean position (see FIG. 7) are 0.0022e-5 volts for real part and 0.0017e-5 volts for the imaginary part.

For diagonal terms, XX, YY, and ZZ, with the exception of the imaginary ZZ DC coefficient, the percentage difference of the Fourier coefficients between the random and mean position cases are very small—generally less than 0.2%. The percentage difference for the imaginary ZZ DC coefficient is about 10% because the amplitude of the imaginary ZZ DC coefficient is roughly 2 orders of magnitude smaller than the real part of the ZZ. The random motion generally would cause larger percentage change in the smaller component. As will be shown later, the effect of this 10% difference in the smaller components would be further reduced if one uses the compensated measurements which tend to provide additional averaging. For the off-diagonal terms, the percentage differences of the Fourier coefficients vary but generally are smaller than a few percent.

Figure 9:
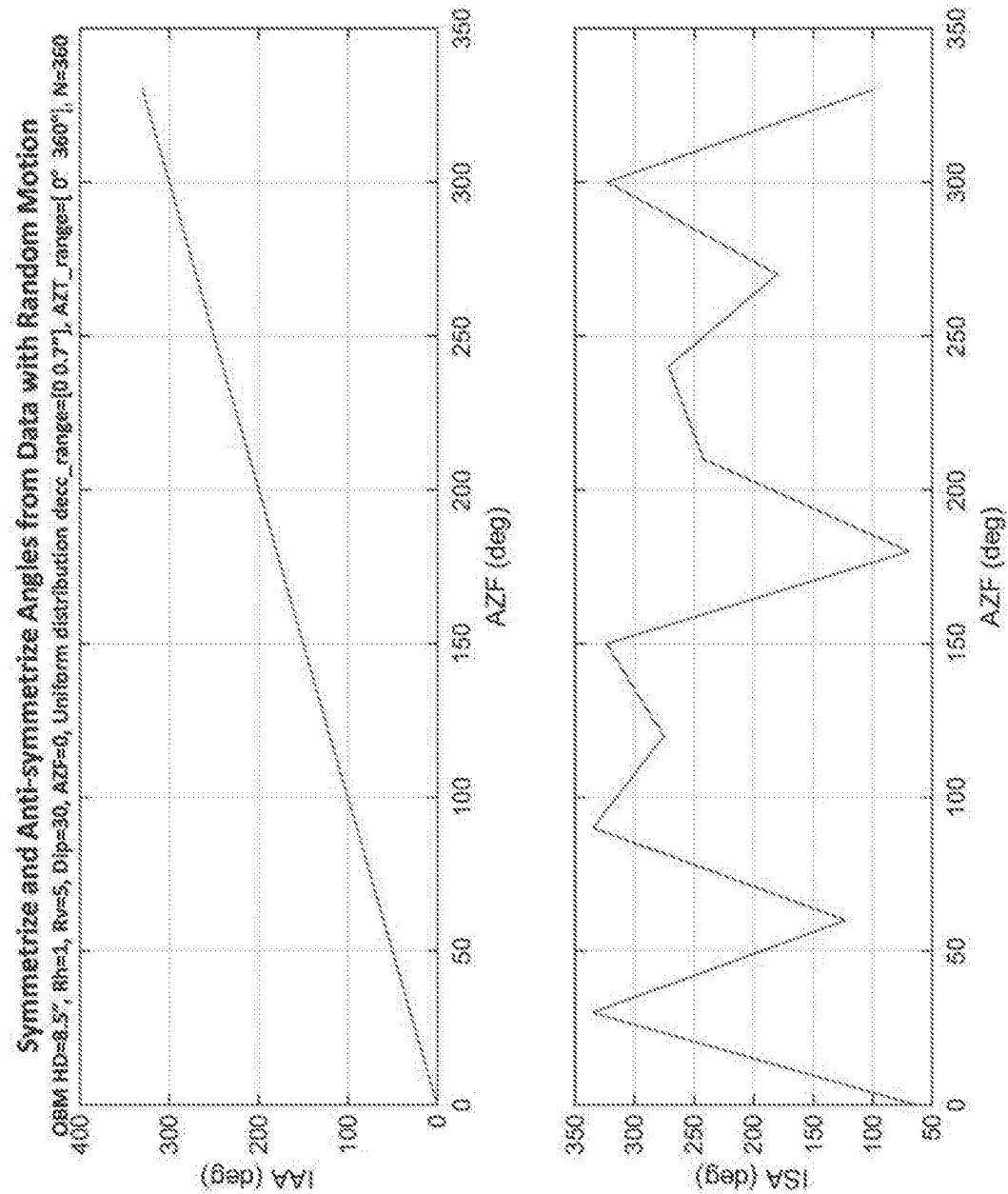
FIG. 9 shows symmetrized and anti-symmetrized angles obtained from the Fourier coefficients of FIG. 8.

Using the data with tool random motion, the apparent formation azimuth ($AZF_{app}$) and tool deccenter azimuth ($AZT_{app}$) can be calculated using Eq. (18) and (19). The symmetrized and anti-symmetrized angles thus obtained are plotted in FIG. 9. The $AZF_{app}$ (IAA) is on the top and $AZT_{app}$ (ISA) is on the bottom. The IAA for the 12 cases of formation azimuth match well to the formation azimuth and therefore produces a nearly perfect straight line on the top plot. The ISA angles appear to be random because the mean tool position for this data set is at the center and tool decenter azimuth is undefined.

Figure 10:
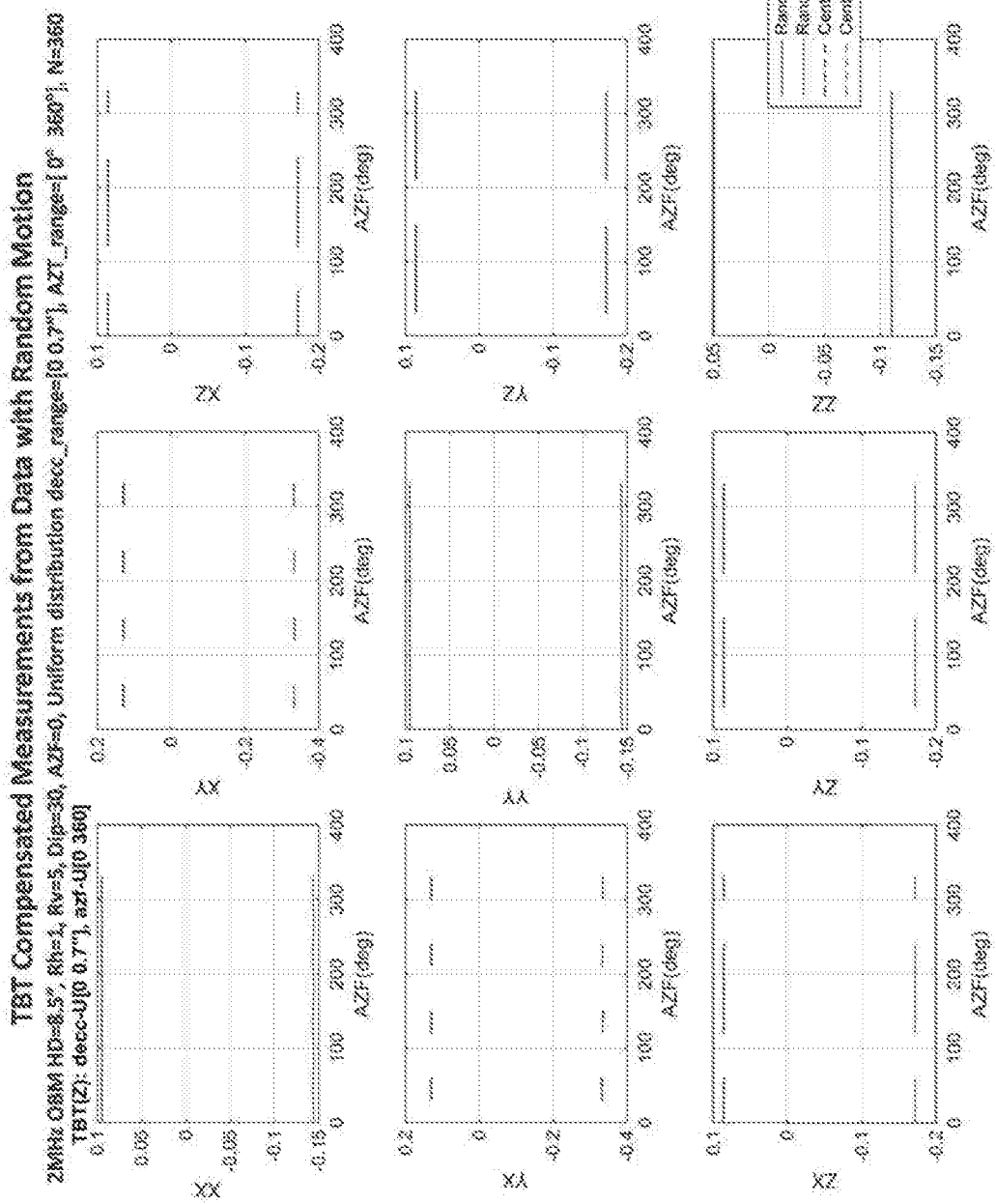
FIG. 10 shows measurements compensated for tool motion as a function of the Fourier coefficients of FIG. 8.

The term-by-term (TBT) compensated measurements (Eq. (36)) constructed from these data records with a uniformly distributed random motion in the decc range of [0 0.7"] and an AZT range of [0 360° ] are shown in FIG. 10. For reference purposes, the TBT compensated measurements from tool at a mean position (centered) are also plotted on FIG. 10 as dash curves. The two TBT compensated measurements, solid from random and dash from centered, are very close to each other such that the difference is difficult to notice with the current display scale. The percentage difference between the solid and dash curves will be explained below later. Two noteworthy points for these results are that the off-diagonal terms of TBT compensated measurements for centered data are expected to be azimuthally invariant, which is demonstrated clearly in the plot. The XZ, ZX, YZ, and ZY components are the same and have the same value for each AZF. Similarly, the XY and YX components are the same and have the same value for each AZF. Second, the gaps on the plots are at zero-crossing points of the measurements at which TBT compensated measurements are ill-defined (zero divided by zero). In the TBT algorithm, a step of tracking the zeros (small number) of the input measurements to prevent outputs instability due to small number divided by another small number is added. When a "zero" is detected in the input for denominator, the output is assigned with a NaN (not-a-number) which the plotting routine would ignore.

Figure 11:
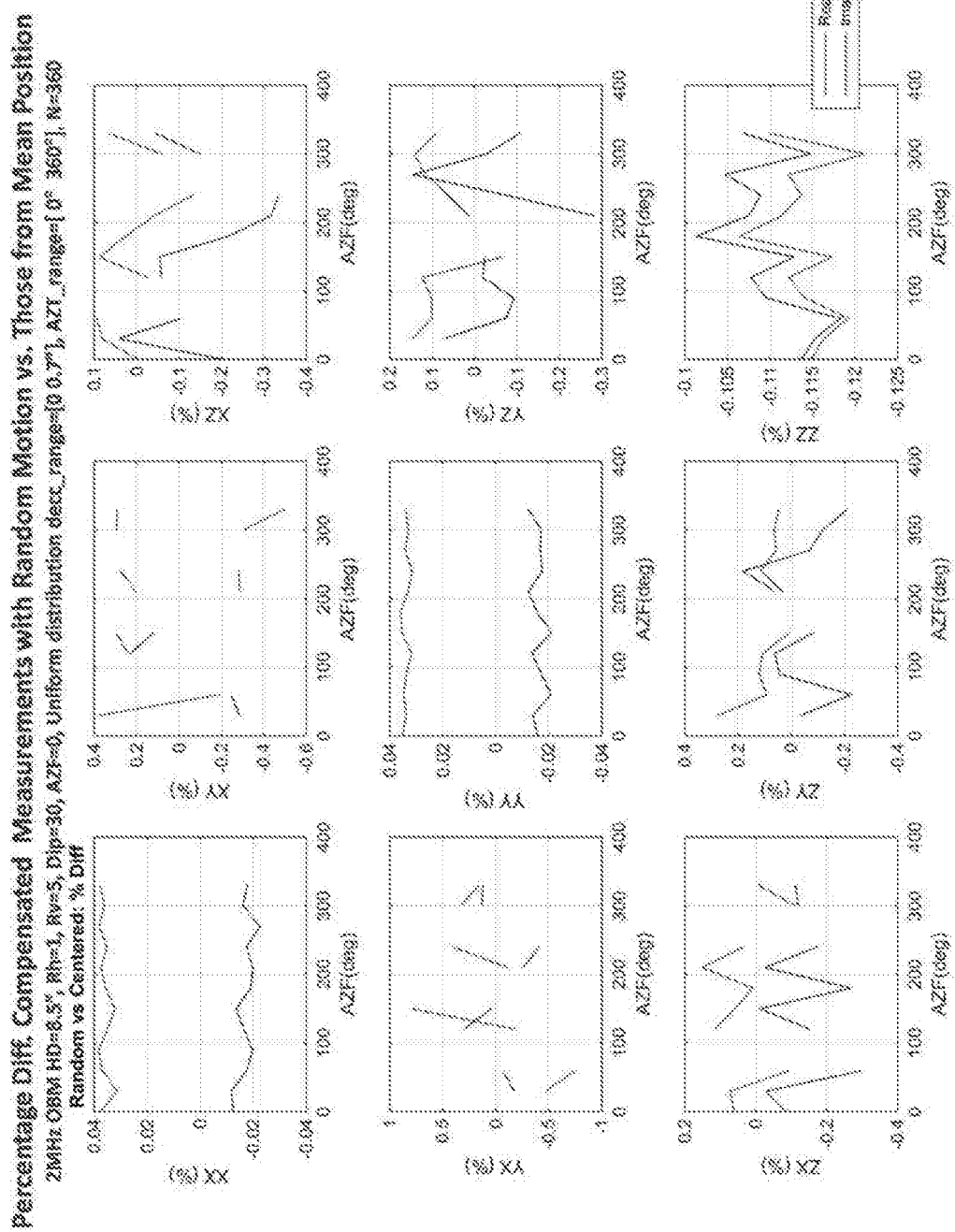
FIG. 11 shows the differences in percentage between random and centered data, using the compensated measurements of FIG. 10.

The percentage differences of the TBT measurements between random and centered data on FIG. 10 are shown in FIG. 11. The components have a percentage difference within 1%, with the diagonal components, XX, YY, and ZZ, having differences less than 0.1%. Thus, the results on FIGS. 9, 10, and 11 suggest that the least square averaging process in obtaining the Fourier coefficient indeed produces results equivalent to those from stationary tool at the mean position.

A second example will now be described. Here, the modeled data is for a 6 inch diameter tool moving randomly with a normal distribution having a mean position not at the center of an 8.5 inch borehole. For this second modeling series, the 8.5 inch diameter borehole is filled with Rm=1000 ohm-m oil based mud. The formation outside the borehole is also the same anisotropic formation with Rh=1 ohm-m, Rv=5 ohm-m, but the dip is higher at 75°. Twelve cases of dip azimuth from 0° to 330° with increment of 30° are modeled. For each case, 360 complete transimpedance voltage sets (Nrec=360) are generated as the 6-in diameter tool is rotating and assuming random normal distributions of decc and ψ values according to Eq. (3) and (4). The mean and standard deviation of the normal distribution for decc and ψ are decc_mean=0.35", decc_std=0.2", $\psi_{mean}$=300°, and $\psi_{std}$=60°. This random motion mimics those of a real tool drilling in a highly deviated well where the mean tool position is toward the bottom half of the borehole and is climbing the right side of the borehole wall (see FIG. 6(b)). The n in Eq. (3) and (4) for these Nrec record is n=Nrec*6 because each record includes 6 firing sub-cycles.

Figure 12:
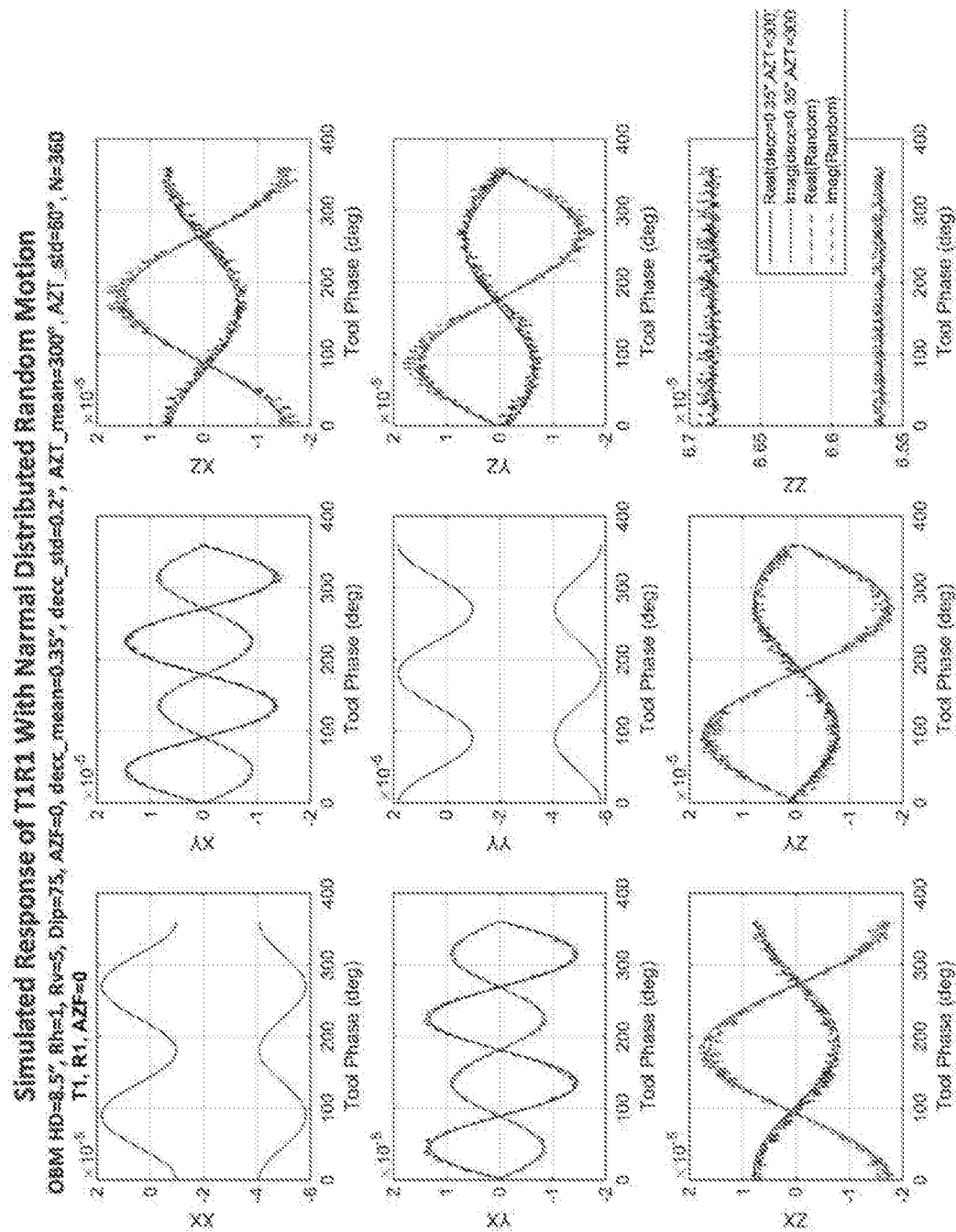
FIG. 12 includes additional graphs showing tool response as a function of tool phase angle.

Shown in FIG. 12 are plots of simulated near spacing (T1R1) data records as a function of tool phase angle for the case of AZF=0°. The real part of the measurement is blue dashed curve and imaginary part is red dashed curve. For reference purposes, the real and imaginary of the measurements from a tool stationary at mean positions (decc_mean=0.35" and $\psi_{mean}$=300°) are plotted as solid blue and red, respectively. The measurements with normal distributed random tool motion also behave like an additive noise on the corresponding measurements from the mean tool position. The standard deviation of such random motion induced "noise" is computed as the standard deviation between the measurement and the corresponding one from the mean positioned tool. Notice that the size of the normal distributed random motion induced noise is also very small for the diagonal components, XX, YY, and ZZ, consistent with the expectation derived from modeled tool position effect on FIG. 4.

Figure 13:
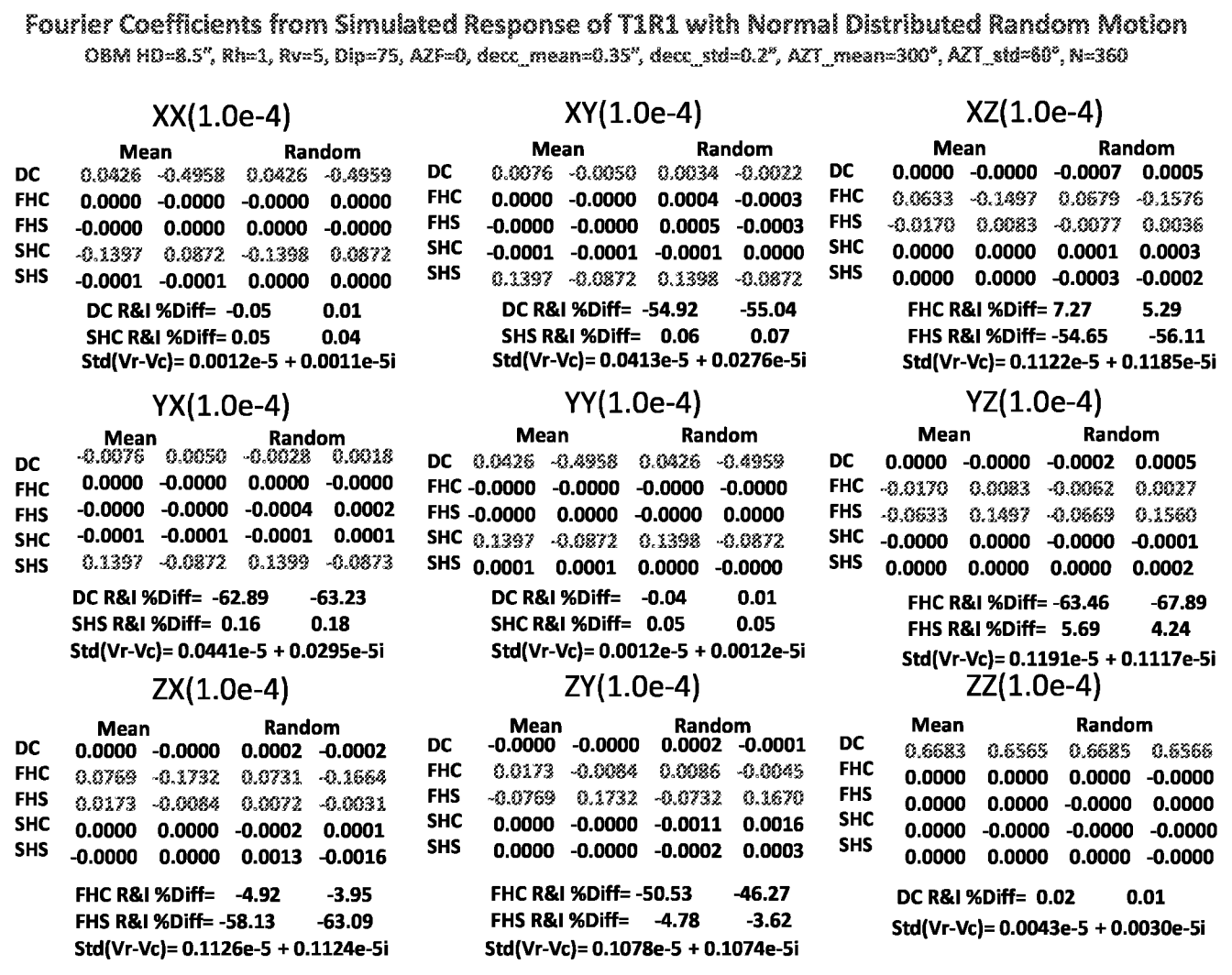

Using the least square algorithm Eq. (7)-(9), the first 5 Fourier coefficients, namely DC, first harmonic cosine (FHC), first harmonic sine (FHS), second harmonic cosine (SHC), and second harmonic sine (SHS) are computed. Shown in FIG. 13 are the Fourier coefficients obtained from the simulated data record on FIG. 11. Also listed are the standard deviation of the difference between the measurements with random tool motion and those from the mean position. The percentage difference between the significant Fourier coefficients from the measurements with random tool motion and those at the center of the borehole are also tabulated. The formats of these tabulations are the same as those in FIG. 8.

For the diagonal terms, XX, YY, and ZZ, the percentage difference of the Fourier coefficients between the random and mean position cases are very small, generally being less than 0.05%. Contrasting to the case 1 of mean position being at the center of the borehole, for this case 2 of mean position not being at the center, the real and imaginary parts of the ZZ DC coefficient are comparable in magnitude. Therefore, the percentage differences for both real and imaginary parts of the coefficient are very small, being 0.02% and 0.01%, respectively. On the other hand, the off-diagonal terms XY and YX show one additional DC coefficient (compared with case 1) in addition to the second harmonic coefficients. This amplitude of the DC coefficients are much smaller than those for the second harmonic and therefore the percentage differences between the mean position and random position are of order of 50%. Similarly, the FHS coefficient for XZ and ZX components are much smaller than the FHC coefficient, and FHC coefficients of the YZ and ZY components are much smaller than the FHS coefficient. Therefore the percentage differences between the mean position and random position of these 4 coefficients are also of order of 50%. These 4 small coefficients are related to the y-direction coupling in an anisotropic formation with dip azimuth points to x-direction (AZF=0). For the larger amplitude off-diagonal terms, the percentage differences of the Fourier coefficients vary but generally are smaller than a few percent. Again, as will be shown later, the effect of these seemingly large percentage differences of very small coefficients is reduced significantly when one evaluate the compensated measurements.

Using the data with tool random motion, the apparent formation azimuth ($AZF_{app}$) and tool deccenter azimuth ($AZT_{app}$) can be calculated using Eq. (18) and (19). The symmetrized and anti-symmetrized angles thus obtained are plotted in FIG. 14. The $AZF_{app}$ (IAA) is on the top and $AZT_{app}$ (ISA) is on the bottom. The IAA for the 12 cases of formation azimuth match well to the formation azimuth and therefore produces nearly a perfect straight line on the top plot. The ISA angles match the mean tool decenter azimuth (300°) well.

Figure 15:
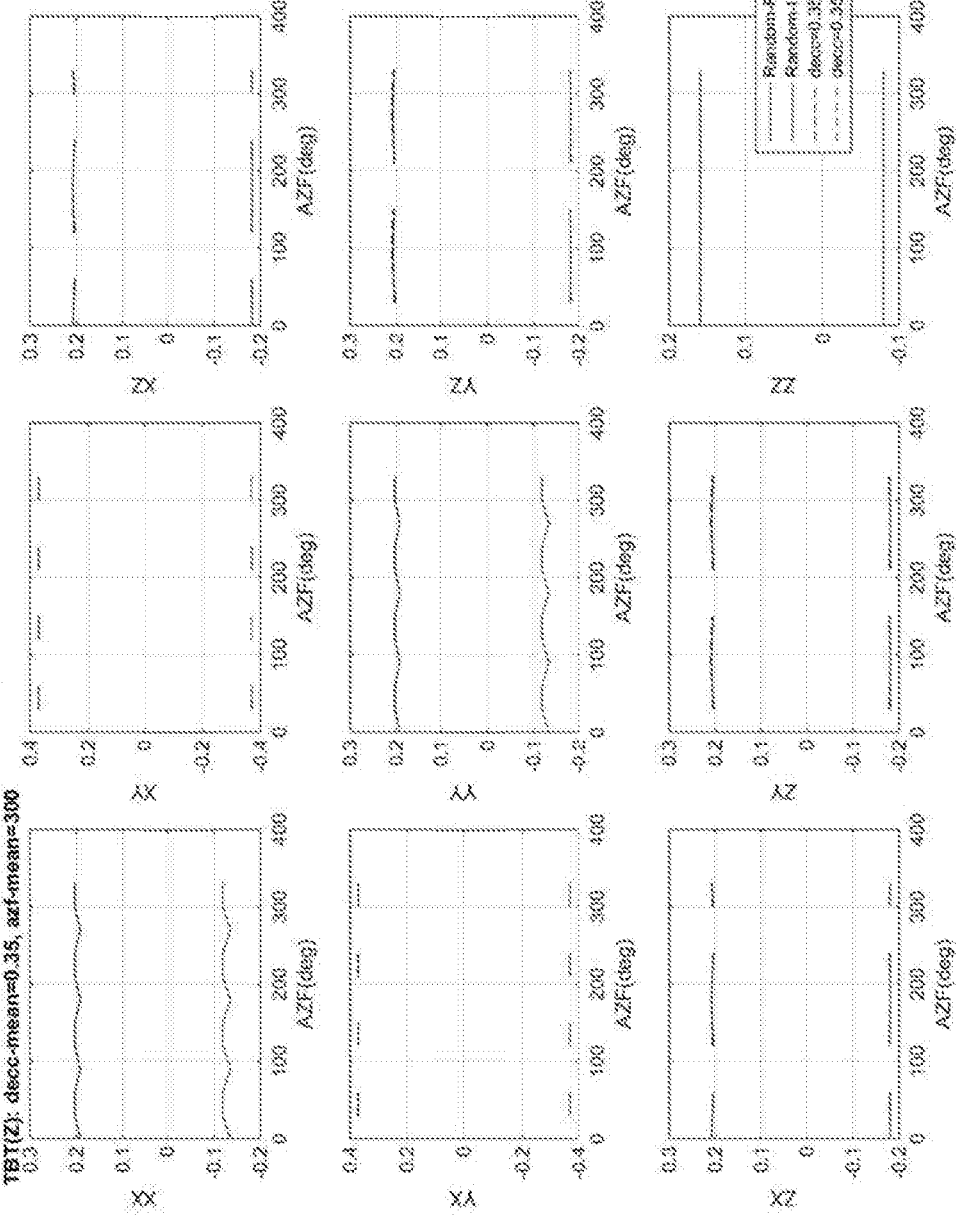
FIG. 15 shows measurements compensated for tool motion as a function of the Fourier coefficients of FIG. 13.

The term-by-term (TBT) compensated measurements (Eq. (36)) constructed from these data records with a normal distributed random motion are shown in FIG. 15. For reference purposes, the TBT compensated measurements from the tool at mean position (decc_mean=0.35" and $\psi_{mean}$=300°) are also plotted on FIG. 15 as dash curves. The two TBT compensated measurements, shown as solid from a random position and dashed from a mean position, are closer than can be seen with the display scale of the graphs. The percentage difference between the solid and dashed curves will be discussed below. Unlike the case where the mean position is centered, the off-diagonal terms XZ, ZX, YZ, and ZY of TBT compensated measurements for this data from an off-center mean position is no longer azimuthally invariant. A slight curvature can be seen on the plot. For the XX and YY component, the second harmonic of AZF feature appears clearly.

Figure 16:
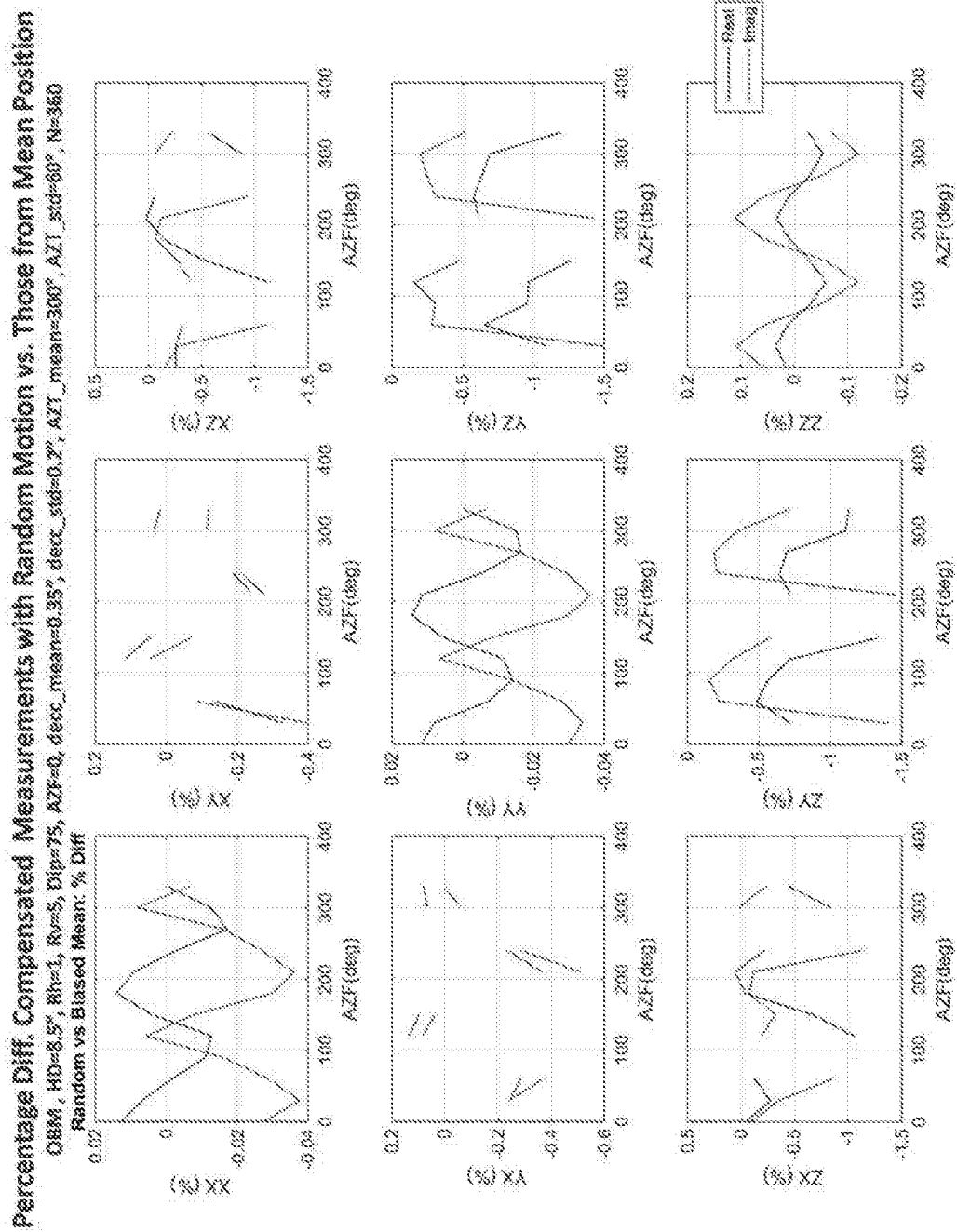
FIG. 16 shows the differences in percentage between random and centered data, using the compensated measurements of FIG. 15.

The percentage differences of the TBT measurements between random and centered data on FIG. 15 are shown in FIG. 16. The diagonal components, XX, YY, and ZZ have percentage differences within 0.04% while the off-diagonal components have percentage differences of less than 1.5%.

Figure 14:
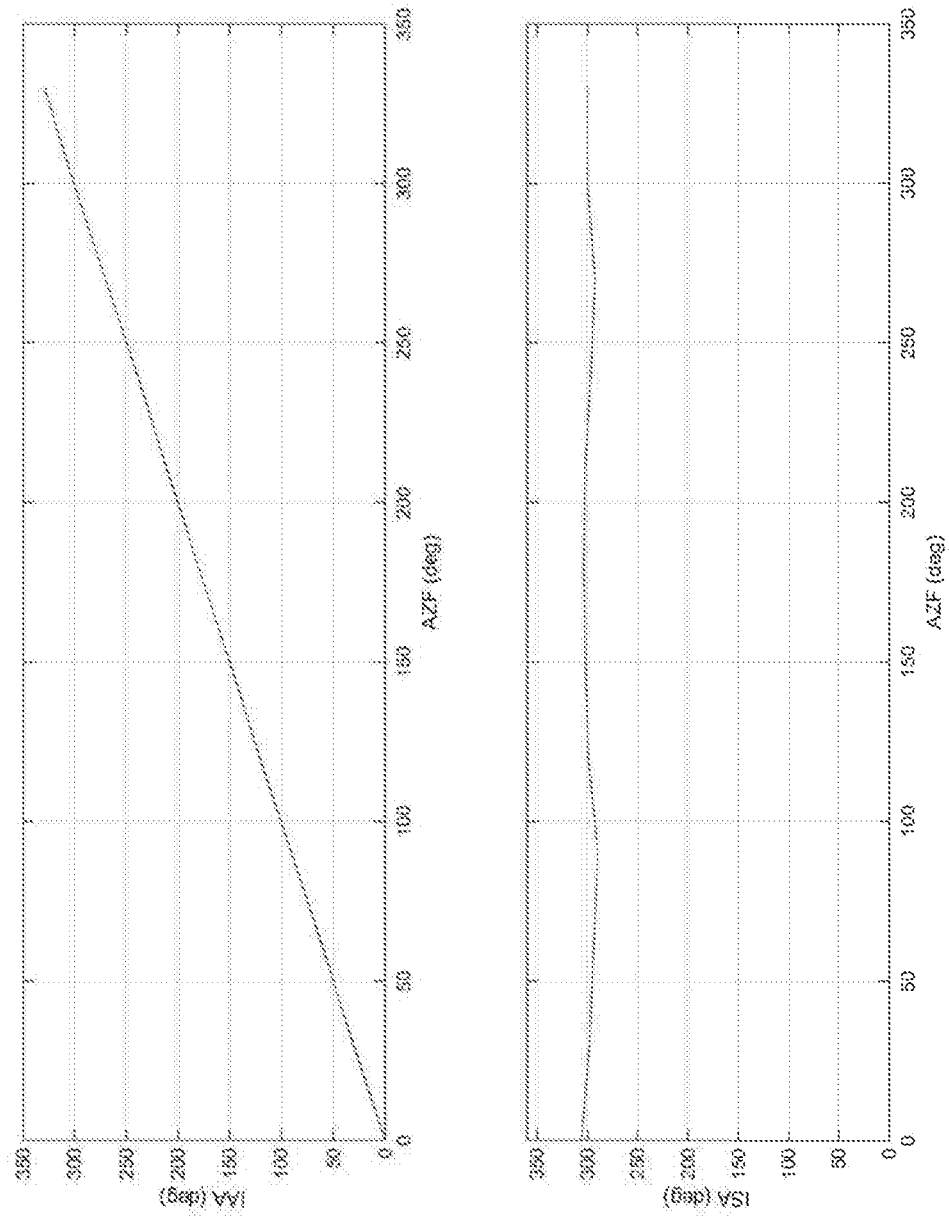
FIG. 14 shows symmetrized and anti-symmetrized angles obtained from the Fourier coefficients of FIG. 13.

Results from this case as shown in FIGS. 14, 15, and 16 further confirm that the least square averaging process in obtaining the Fourier coefficient indeed produces compensated measurements equivalent to those from a stationary tool at the mean position.

The results above show that through the least square process, the data records obtained as the tool moves randomly in the borehole produce compensated measurements that match well with those from the mean position of the tool. For a record length Nrec=360, the percentage differences between data with random motion and that from the mean position for the diagonal components XX, YY, and ZZ are generally less than 0.1%, and for the off-diagonal terms less than 1.5%. The degree of match is expected to be dependent on the record length Nrec, with a larger Nrec indicating having a better. Results showing the effect of the record length on the standard deviation between the data with random motion and those recorded stationary at the mean position will be given.

Figure 17:
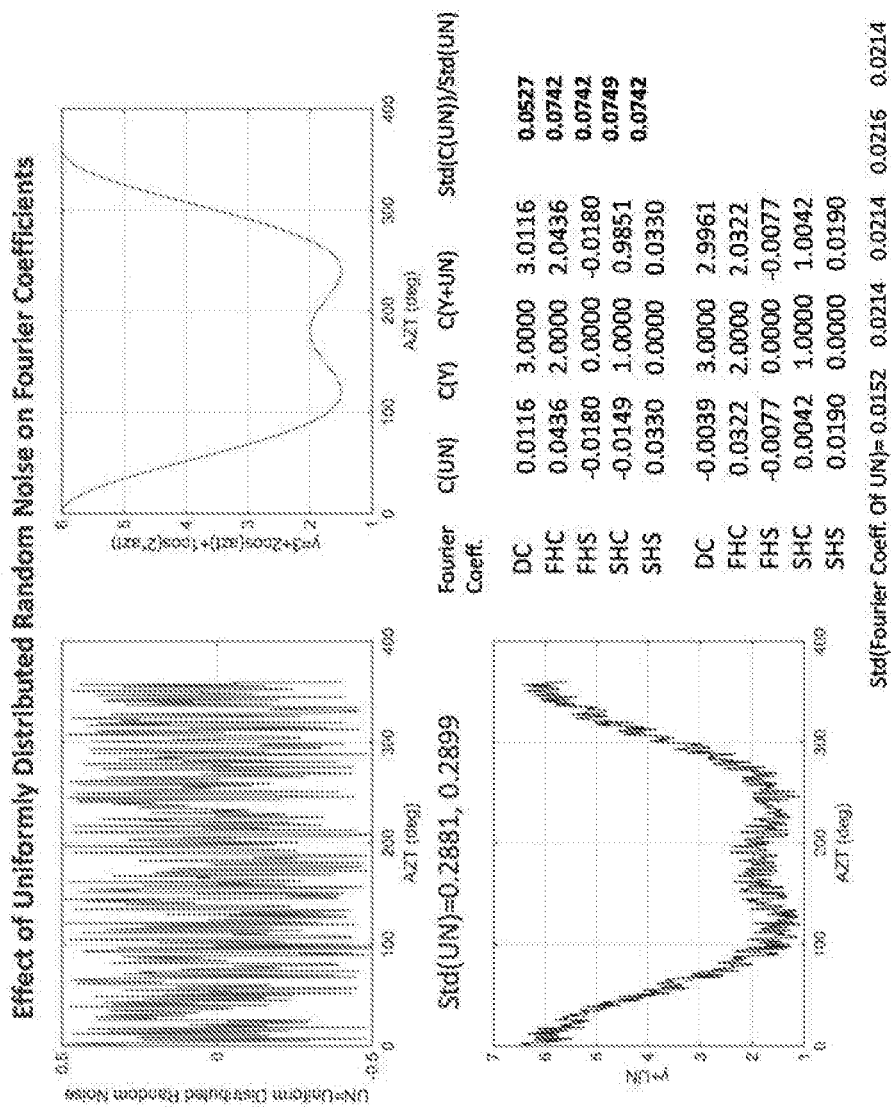
FIG. 17 shows the effect of uniformly distributed random noise on the Fourier coefficients.

In order to understand the statistics of the Fourier coefficients due to the random motion of the tool, the behavior of Fourier coefficients due to some pseudo-random sequences will be examined. Shown in FIG. 17 top left is an example of uniformly distributed random noise UN with amplitude distributed in [−0.5 0.5] range as function of AZT. On top right is a fictitious signal y=3+2*cos(AZT)+1*cos(2*AZT) consisting of DC, first harmonic cosine and second harmonic cosine terms mimicking the Fourier components of the tool's coupling tensors. Plotted on lower left are signal plus noise, y+UN, in blue and signal y in red. The record length of the signal and noise are 360 points. The estimated Fourier coefficients for y, UN, and y+UN are C(y), C(UN) and C(y+UN), respectively. On the lower right are C(y), C(UN) and C(y+UN) from 2 independent realizations of random records. The results confirm that the least square algorithm is a linear process and therefore:

$$C(y+UN)=C(y)+C(UN) \qquad \text{Eq. (42)}$$

For a clean signal y, the function C(y) returns the expected coefficients DC=3, FHC=2, SHC=1. While the standard deviations of the UN, Std(UN)=0.2881, 0.2899, for the two successive independent realizations are stable, the C(UN) varies quite a bit between the two successive independent realizations.

Figure 18:
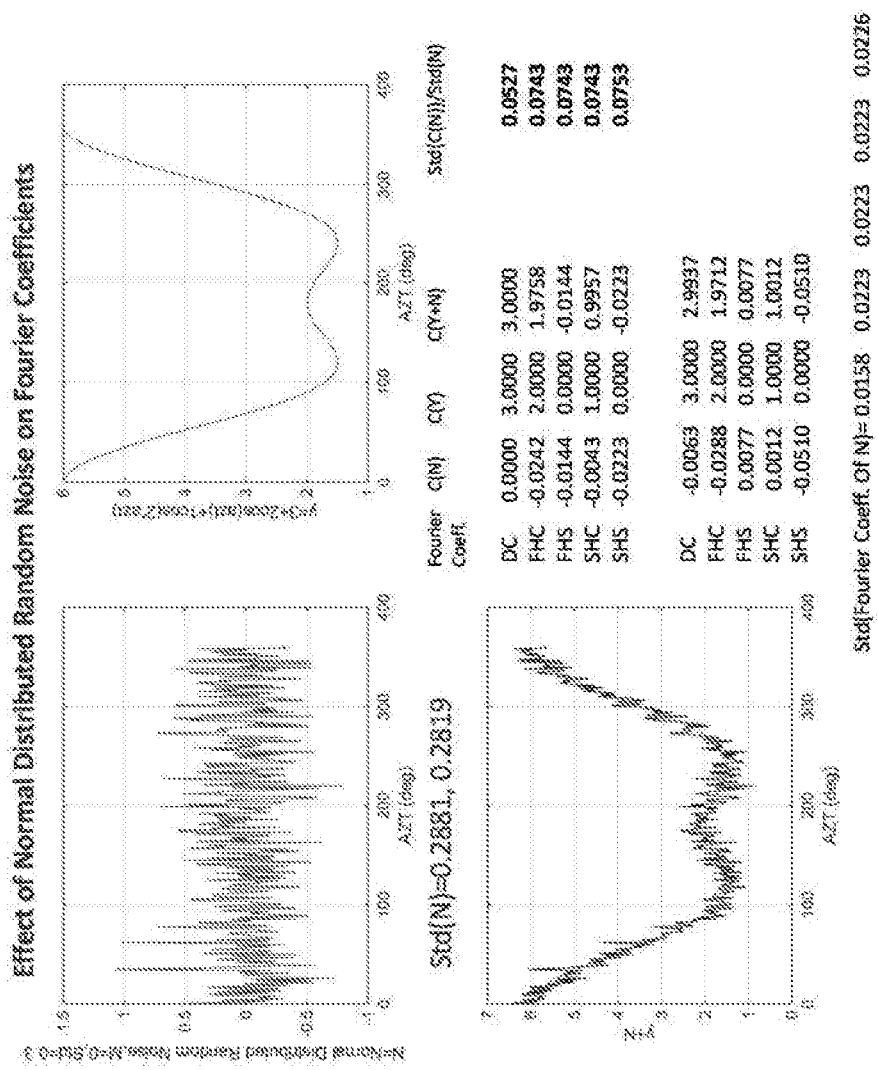
FIG. 18 shows the effect of normally distributed random noise on the Fourier coefficients.

FIG. 18 shows similar results with random noise of normal distribution. The top left is an example of normal distributed random noise N with standard deviation of 0.3 as function of AZT. On top right is the same fictitious signal y=3+2*cos(AZT)+1*cos(2*AZT). Plotted on lower left are signal plus noise, y+N, in blue and signal y in red. The record length of the signal and noise are 360 points. The estimated Fourier coefficients for y, N, and y+N are C(y), C(N) and C(y+N), respectively. On the lower right are C(y), C(N) and C(y+N) from 2 independent realizations of random records. The standard deviation of the N, Std(N)= 0.2881, 0.2819, for the two successive independent realizations are quite stable, the C(N) also varies quite a bit between the two successive independent realizations.

Figure 19:
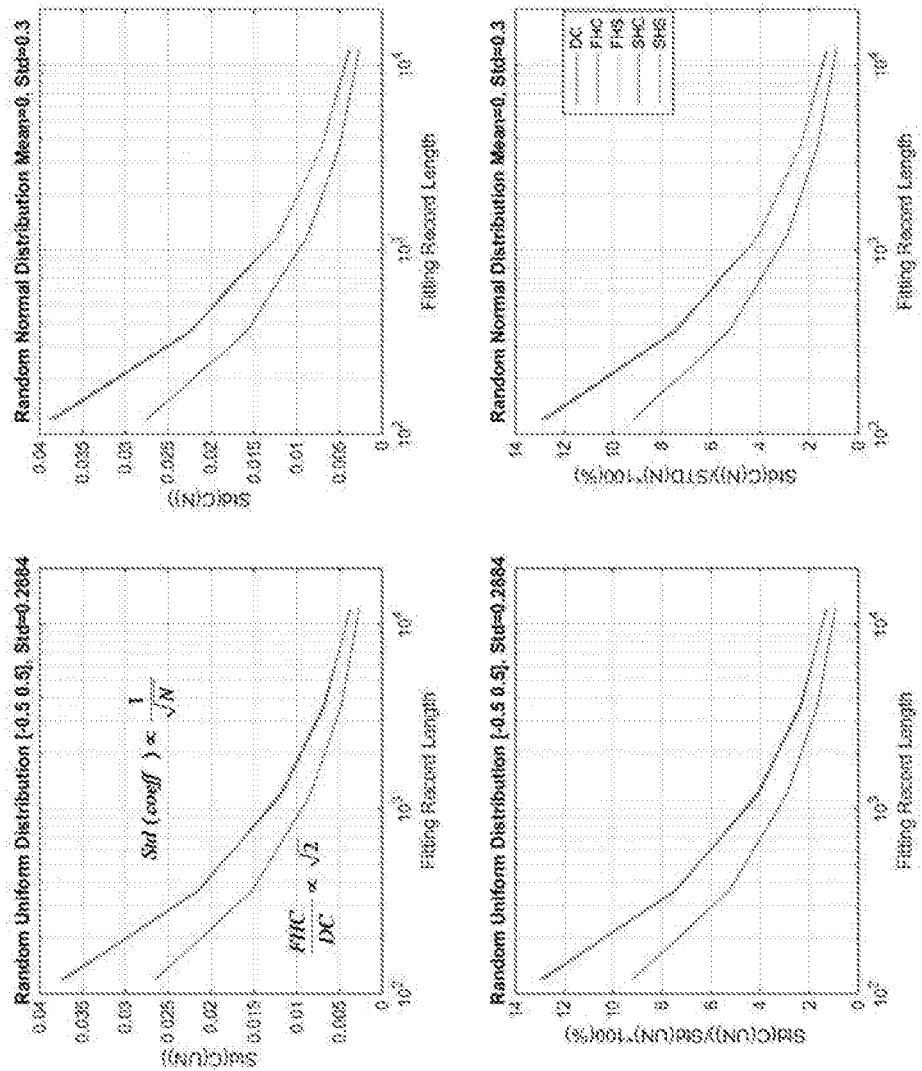
FIG. 19 includes graphs showing how the standard deviations of Fourier coefficients due to random noise decrease inversely with the square root of fitting record length.

To determine the standard deviation of Fourier coefficients of random noise, statistical experimentation has been carried out by varying the fitting data record length up to 10,000 for both uniform and normal distributed random noise. The results are plotted on FIG. 19. The standard deviations of Fourier coefficients due to random noise decrease inversely with the square root of fitting record length. The standard deviations of Fourier coefficients due to random noise could also be expressed as certain percentage of the standard deviation of the random noise.

The standard deviations of Fourier coefficients of uniformly distributed random noise of length 360 (see FIG. 17) are:

Std($C(UN)$)=0.0152 0.0214 0.0214 0.0216 0.0214

Notice that the standard deviation of the coefficients for higher harmonics are the same and are a factor of $\sqrt{2}$ higher than that for the DC coefficient. Therefore, the standard deviation of a given noise, StdUN, is known, the standard deviations of Fourier coefficients of the noisy signal can be estimated as:

Std($C(y+UN)$)=Std($C(UN)$)=Std$UN$*[0.0152 0.0214 0.0214 0.0216 0.0214]/0.2884=Std$UN$*[0.0527 0.0742 0.0742 0.0749 0.0742]   Eq. (43)

This means that the standard deviation of the DC coefficient is about 5.27% of the standard deviation of the noise, while standard deviations of the coefficients for the higher harmonics are about 7.42% of the standard deviation of the noise.

As shown in FIG. 18, the standard deviations of the Fourier coefficients of normal distributed random noise of record length 360 are:

Std($C(N)$)=0.0158 0.0223 0.0223 0.0223 0.0226

Similarly, the standard deviation of the coefficients for the higher harmonics are the same and are a factor of $\sqrt{2}$ higher than that for the DC coefficient. Therefore, if the standard deviation of a given noise, StdN, is known, the standard deviation of the coefficient of the noisy signal can be estimated as:

Std($C(y+N)$)=Std($C(N)$)=Std$N$*[0.0158 0.0223 0.0223 0.0223 0.0226]/0.3=Std$N$*[0.0527 0.0743 0.0743 0.0743 0.0753]   Eq. (44)

This means that the standard deviation of the DC coefficient is about 5.27% of the standard deviation of the normal distributed noise, while standard deviations of the coefficients for the higher harmonics are about 7.43% of the standard deviation of the normal distributed noise. These results are extremely close to that derived from uniformly distributed noise. These results illustrate the trade-off between desirable accuracy and data record length which would affect the logging speed.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. A method comprising:
placing a downhole tool in a geological stratum;
acquiring a set of transimpedance coupling voltages, between different antenna components of different axes of a transmitting station transmitting into a formation and different antenna components of different axes of a receiving station receiving from the formation, using an induction tool undergoing random movement during the acquisition;
determining Fourier coefficients of the set of transimpedance coupling voltages using a least square process, using a computing device;
estimating a mean tool eccentering azimuthal angle and an apparent formation azimuthal angle as a function of the Fourier coefficients, using the computing device;
computing compensated measurements as a function of the Fourier coefficients, using the computing device; and
executing an inversion loop comprising receiving as input the compensated measurements, the estimated mean tool eccentering azimuthal angle, and the estimated apparent formation azimuth, and outputting final parameters as a function thereof, using the computing device.

2. The method of claim 1, wherein the final parameters comprise at least one of conductivity of mud in a borehole in which the induction tool is disposed, a diameter of the borehole in which the induction tool is disposed, horizontal resistivity, vertical resistivity, formation dip, final mean tool eccentering azimuthal angle, final mean apparent formation azimuthal angle, and final mean tool eccentering distance.

3. The method of claim 1, wherein estimating the mean tool eccentering azimuthal angle comprises:
calculating at least one compensated symmetrized measurement as a function of the Fourier coefficients, using the computing device; and
estimating the mean tool eccentering azimuthal angle as a function of the at least one compensated symmetrized measurement, using the computing device.

4. The method of claim 3, wherein the at least one compensated symmetrized measurement is azimuthally variant.

5. The method of claim 1, wherein estimating the apparent formation azimuthal angle comprises:
calculating at least one compensated anti-symmetrized measurement as a function of the Fourier coefficients, using the computing device; and
estimating the apparent formation azimuthal angle as a function of the at least one compensated anti-symmetrized measurement, using the computing device.

6. The method of claim 1, further comprising estimating a mean tool eccentering distance as a function of at least one compensated symmetrized measurement and the mean tool eccentering azimuthal angle, using the computing device; and wherein the at least one compensated symmetrized measurement is calculated as a function of the Fourier coefficients.

7. The method of claim 1, wherein the compensated measurements are compensated for gains of the transmitter station and the receiver station.

8. The method of claim 1, wherein at least some of the compensated measurements are azimuthally invariant.

9. The method of claim 1, wherein executing the inversion loop comprises:
computing responses of modeled compensated measurements for guess final parameters as a function of the mean tool eccentering azimuthal angle and the apparent formation azimuthal angle, using the computing device;
comparing the responses of the modeled compensated measurements to the compensated measurements with a cost function, using the computing device;
when the cost function is larger than a threshold, adjusting the guess final parameters, computing the responses of the modeled compensated measurements for the adjusted guess final parameters, and comparing the responses of the modeled compensated measurements for the adjusted guess final parameters to the compensated measurements with the cost function, using the computing device; and when the cost function is less than the threshold, outputting the final parameters as a function of the compensated measurements, using the computing device.

10. The method of claim 1, wherein the random movement comprises random changes in tool eccentering distance and tool eccentering azimuthal angle; wherein changes in tool eccentering distance comprise lateral movements of a longitudinal axis of the induction tool with respect to a longitudinal axis of a borehole in which the induction tool is disposed; and wherein changes in tool eccentering azimuthal angle comprise changes an angle of a vector extending from the longitudinal axis of the borehole to the longitudinal axis of the induction tool.

11. A well logging apparatus comprising:
a resistivity sub comprising:
at least one transmitter station comprising a plurality of transmission antenna components each corresponding to a different axis;
at least one receiver station comprising a plurality of reception antenna components each corresponding to a different axis; and
control apparatus for the resistivity sub configured to operate the resistivity sub so as to:
transmit signals from the at least one transmitter station while the resistivity sub is undergoing random movement,
measure a set of transimpedance coupling voltages between the at least one transmitter station and the at least one receiver station while the resistivity sub is undergoing random movement,
determine Fourier coefficients of the set of transimpedance coupling voltages using a least square process,
estimate a mean tool eccentering azimuthal angle and an apparent formation azimuthal angle as a function of the Fourier coefficients,
compute compensated measurements as a function of the Fourier coefficients, using the computing device, and
execute an inversion loop comprising receiving as input the compensated measurements, the estimated mean tool eccentering azimuthal angle, and the estimated apparent formation azimuth, and outputting final parameters as a function thereof.

12. The well logging apparatus of claim 11, wherein the control apparatus estimates the mean tool eccentering azimuthal angle by:
calculating at least one compensated symmetrized measurement as a function of the Fourier coefficients, using the computing device; and
estimating the mean tool eccentering azimuthal angle as a function of the at least one compensated symmetrized measurement, using the computing device.

13. The well logging apparatus of claim 11, wherein the control apparatus estimates the apparent formation azimuthal angle by:
calculating at least one compensated anti-symmetrized measurement as a function of the Fourier coefficients, using the computing device; and
estimating the apparent formation azimuthal angle as a function of the at least one compensated anti-symmetrized measurement, using the computing device.

14. A system comprising:
one or more processors;
memory operatively coupled to the one or more processors; and
processor-executable instructions stored in the memory and executable by at least one of the processors to instruct the system to:
determine Fourier coefficients of a set of transimpedance coupling voltages using a least square process;
estimate a mean tool eccentering azimuthal angle and an apparent formation azimuthal angle as a function of the Fourier coefficients;
compute compensated measurements as a function of the Fourier coefficients; and
executing an inversion loop comprising receiving as input the compensated measurements, the estimated mean tool eccentering azimuthal angle, and the estimated apparent formation azimuth, and outputting final parameters as a function thereof.

15. The system of claim 14, wherein the final parameters comprise at least one of conductivity of mud in a borehole, a diameter of the borehole, horizontal resistivity, vertical resistivity, formation dip, final mean tool eccentering azimuthal angle, final mean apparent formation azimuthal angle, and final mean tool eccentering distance.

16. The system of claim 14, wherein estimate the mean tool eccentering azimuthal angle comprises:
calculate at least one compensated symmetrized measurement as a function of the Fourier coefficients; and
estimate the mean tool eccentering azimuthal angle as a function of the at least one compensated symmetrized measurement.

17. The system of claim 16, wherein the at least one compensated symmetrized measurement is azimuthally variant.

18. The system of claim 14, wherein estimate the apparent formation azimuthal angle comprises:
calculate at least one compensated anti-symmetrized measurement as a function of the Fourier coefficients; and
estimate the apparent formation azimuthal angle as a function of the at least one compensated anti-symmetrized measurement.

19. The system of claim 14, wherein processor-executable instructions stored in the memory and executable by at least one of the processors further comprise instructions to estimate a mean tool eccentering distance as a function of at least one compensated symmetrized measurement and the mean tool eccentering azimuthal angle; and wherein the at least one compensated symmetrized measurement is calculated as a function of the Fourier coefficients.

20. The system of claim 14, wherein at least some of the compensated measurements are azimuthally invariant.

* * * * *